(12) United States Patent
Hasbun et al.

(10) Patent No.: US 11,340,830 B2
(45) Date of Patent: May 24, 2022

(54) MEMORY BUFFER MANAGEMENT AND BYPASS

(71) Applicant: Micron Technology, Inc., Boise, ID (US)

(72) Inventors: Robert Nasry Hasbun, San Jose, CA (US); Dean D. Gans, Nampa, ID (US); Sharookh Daruwalla, San Ramon, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/932,032

(22) Filed: Jul. 17, 2020

(65) Prior Publication Data
US 2020/0348883 A1 Nov. 5, 2020

Related U.S. Application Data

(63) Continuation of application No. 15/975,607, filed on May 9, 2018, now Pat. No. 10,754,578.

(51) Int. Cl.
*G06F 3/06* (2006.01)
*G06F 13/16* (2006.01)
(Continued)

(52) U.S. Cl.
CPC ............ *G06F 3/0656* (2013.01); *G06F 3/061* (2013.01); *G06F 3/0658* (2013.01);
(Continued)

(58) Field of Classification Search
CPC .............. G06F 3/0626; G06F 12/0246; G06F 2212/602; G06F 12/1009; G06F 12/0868;
(Continued)

(56) References Cited

U.S. PATENT DOCUMENTS 6,115,760 A 9/2000 Lo et al.
6,249,461 B1 6/2001 Choi et al.
(Continued)

FOREIGN PATENT DOCUMENTS

CN 102246240 A 11/2011
CN 102792289 A 11/2012
(Continued)

OTHER PUBLICATIONS

ISA/KR, International Search Report and Written Opinion of the International Searching Authority, Int'l. Appl. No. PCT/US2019/028683, dated Aug. 27, 2019, Korean Intellectual Property Office, Seo-gu, Daejeon, Republic of Korea, 12 pgs.
(Continued)

*Primary Examiner* — Idriss N Alrobaye
*Assistant Examiner* — Richard B Franklin
(74) *Attorney, Agent, or Firm* — Holland & Hart LLP

(57) ABSTRACT

Methods, systems, and devices for memory buffer management and bypass are described. Data corresponding to a page size of a memory array may be received at a virtual memory bank of a memory device, and a value of a counter associated with the virtual memory bank may be incremented. Upon determining that a value of the counter has reached a threshold value, the data may be communicated from the virtual memory bank to a buffer of the same memory device. For instance, the counter may be incremented based on the virtual memory bank receiving an access command from a host device.

16 Claims, 11 Drawing Sheets

(51) Int. Cl.
*G06F 12/1009* (2016.01)
*G06F 12/02* (2006.01)

(52) U.S. Cl.
CPC .......... *G06F 3/0659* (2013.01); *G06F 3/0679* (2013.01); *G06F 3/0688* (2013.01); *G06F 12/0246* (2013.01); *G06F 12/1009* (2013.01); *G06F 13/1673* (2013.01); *G06F 2212/7203* (2013.01)

(58) Field of Classification Search
CPC ............. G06F 12/0804; G06F 12/0815; G06F 2212/1024; G06F 2212/7203; G06F 2201/815; G06F 2201/88; G06F 2201/885; G06F 3/0611; G06F 3/061; G06F 11/3466; G06F 1/3225; G06F 2209/5022; G06F 2212/1016; G06F 2212/202; G06F 2212/6024; G06F 2212/6026; G06F 3/0625; G06F 3/0656; G06F 3/0658; G06F 3/0659; G06F 3/0679; G06F 3/0688; G06F 13/1673
See application file for complete search history.

(56) References Cited

U.S. PATENT DOCUMENTS

| | | | |
|---|---|---|---|
| 6,353,874 B1 | 3/2002 | Morein | |
| 6,453,389 B1 | 9/2002 | Weinberger et al. | |
| 6,692,976 B1 | 2/2004 | Mirkarimi | |
| 6,963,954 B1 | 11/2005 | Trehus et al. | |
| 7,089,331 B1 | 8/2006 | Gollapudi et al. | |
| 7,526,604 B1 | 4/2009 | Danilak | |
| 7,620,748 B1 | 11/2009 | Bruce et al. | |
| 8,549,210 B2 | 10/2013 | Hunter et al. | |
| 8,788,765 B2 | 7/2014 | Jeddeloh | |
| 8,959,307 B1 | 2/2015 | Bruce et al. | |
| 9,274,965 B2 | 3/2016 | El-mahdy et al. | |
| 9,600,410 B1 | 3/2017 | Nazarian et al. | |
| 9,780,782 B2 | 10/2017 | Bains et al. | |
| 9,916,105 B1 | 3/2018 | Asnaashari | |
| 10,714,159 B2 | 7/2020 | Hasbun et al. | |
| 10,810,125 B2 | 10/2020 | El-mahdy et al. | |
| 10,845,866 B2 | 11/2020 | Hasbun | |
| 2002/0103975 A1* | 8/2002 | Dawkins ............... | G06F 12/122 711/133 |
| 2003/0105926 A1 | 6/2003 | Rodriguez | |
| 2004/0128449 A1 | 7/2004 | Osborne et al. | |
| 2004/0141374 A1 | 7/2004 | Park et al. | |
| 2005/0071570 A1 | 3/2005 | Takasugi et al. | |
| 2006/0026229 A1* | 2/2006 | Ari ..................... | G06F 12/0888 709/203 |
| 2006/0053256 A1 | 3/2006 | Moyer et al. | |
| 2006/0125835 A1 | 6/2006 | Sha et al. | |
| 2006/0259735 A1 | 11/2006 | Anand et al. | |
| 2006/0265552 A1 | 11/2006 | Davis et al. | |
| 2007/0011421 A1 | 1/2007 | Keller et al. | |
| 2007/0038829 A1 | 2/2007 | Tousek | |
| 2007/0067382 A1 | 3/2007 | Sun | |
| 2008/0183977 A1 | 7/2008 | Gower et al. | |
| 2009/0063734 A1 | 3/2009 | Kurata et al. | |
| 2009/0196102 A1 | 8/2009 | Kim | |
| 2009/0265514 A1 | 10/2009 | Biles et al. | |
| 2010/0268886 A1 | 10/2010 | Frey et al. | |
| 2010/0293337 A1 | 11/2010 | Murphy et al. | |
| 2012/0185651 A1 | 7/2012 | Kimori | |
| 2012/0290768 A1 | 11/2012 | Rubowitz | |
| 2014/0040561 A1 | 2/2014 | Lih et al. | |
| 2014/0115294 A1 | 4/2014 | Fleischer et al. | |
| 2014/0237205 A1 | 8/2014 | Takefman et al. | |
| 2015/0347013 A1 | 12/2015 | Mathur et al. | |
| 2015/0371689 A1 | 12/2015 | Li et al. | |
| 2016/0117131 A1 | 4/2016 | Karamcheti et al. | |
| 2016/0350236 A1 | 12/2016 | Tsirkin et al. | |
| 2017/0068467 A1 | 3/2017 | Rothberg | |
| 2017/0083447 A1 | 3/2017 | Xu et al. | |
| 2017/0123988 A1 | 5/2017 | Chun et al. | |
| 2018/0121106 A1 | 5/2018 | Kim | |
| 2018/0165211 A1 | 6/2018 | Wang et al. | |
| 2018/0373313 A1 | 12/2018 | Hasbun | |
| 2018/0373641 A1 | 12/2018 | Partap Singh Rana et al. | |
| 2019/0004796 A1 | 1/2019 | Pelster et al. | |

FOREIGN PATENT DOCUMENTS

| | | |
|---|---|---|
| CN | 103608782 A | 2/2014 |
| CN | 103744624 A | 4/2014 |
| CN | 105612499 A | 5/2016 |
| CN | 106547476 A | 3/2017 |
| KR | 10-2013-0087620 A | 8/2013 |
| WO | 2016097809 A1 | 6/2016 |
| WO | 2017131871 A1 | 8/2017 |

OTHER PUBLICATIONS

ISA/KR, International Search Report and Written Opinion of the International Searching Authority, Int'l. Appl. No. PCT/US2019/028688, dated Aug. 29, 2019, Korean Intellectual Property Office, Seo-gu, Daejeon, Republic of Korea, 12 pgs.

ISA/KR, International Search Report and Written Opinion of the International Searching Authority, Int'l. Appl. No. PCT/US2019/028841, dated Sep. 24, 2019, Korean Intellectual Property Office, Seo-gu, Daejeon, Republic of Korea, 13 pgs.

ISA/KR, International Search Report and Written Opinion of the International Searching Authority, Int'l. Appl. No. PCT/US2019/028843, dated Sep. 26, 2019, Korean Intellectual Property Office, Seo-gu, Daejeon, Republic of Korea, 15 pgs.

European Patent Office, "Extended Search Report," issued in connection with European Patent Application No. 19800511.8, dated Sep. 6, 2021 (8 pages).

European Patent Office, "Extended Search Report," issued in connection with European Patent Application No. 19800839.3, dated Sep. 8, 2021 (8 pages).

Chinese Patent Office, "Office Action," issued in connection with Chinese Patent Application No. 201980030492.X, dated Jun. 30, 2021, 2021 (12 pages).

European Patent Office, "Search Report," issued in connection with EP Patent Application No. 19800211.5, dated Sep. 2, 2021 (8 pages).

Chinese Patent Office, "Office Action," issued in connection with Chinese Patent Application No. 201980038924.1, dated Aug. 3, 2021 (4 pages).

European Patent Office, "Supplemental European Search Report," issued in connection with European Patent Application No. 19800712, dated Dec. 22, 2021 (8 pages).

Office Action received for Korean Patent Application No. 10-2020-7034737, dated Mar. 3, 2022, 17 pages with Translation.

* cited by examiner

MEMORY BUFFER MANAGEMENT AND BYPASS

CROSS REFERENCE

The present application for patent is a continuation of U.S. patent application Ser. No. 15/975,607 by Hasbun et al., entitled "Memory Buffer Management and Bypass," filed May 9, 2018, assigned to the assignee hereof, and is expressly incorporated in its entirety herein.

BACKGROUND

The following relates generally to operating a memory system and more specifically to memory buffer management and bypass.

A memory system may include various kinds of memory devices and controllers, which may be coupled via one or more buses to manage information in numerous electronic devices such as computers, wireless communication devices, internet of things devices, cameras, digital displays, and the like. Memory devices are widely used to store information in such electronic devices. Information may be stored in a memory device by programing different states of one or more memory cells within the memory device. For example, a binary memory cell may store one of two states, often denoted as a logic "1" or a logic "0." Some memory cells may be able to store more than two states.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory cells, e.g., FeRAM cells, may maintain their stored logic state for extended periods of time even in the absence of an external power source. Volatile memory cells, e.g., DRAM cells, may lose their stored logic state over time unless they are periodically refreshed by an external power source.

Improving memory systems, generally, may include reducing system power consumption, increasing memory system capacity, improving read/write speeds, providing non-volatility by use of persistent main memory, or reducing manufacturing costs at a certain performance point, among other metrics. Improvements in memory architecture or operation may be directed to problems related to indiscriminately buffering data, which may result increased read latency or system power consumption.

DETAILED DESCRIPTION

Figure 1:
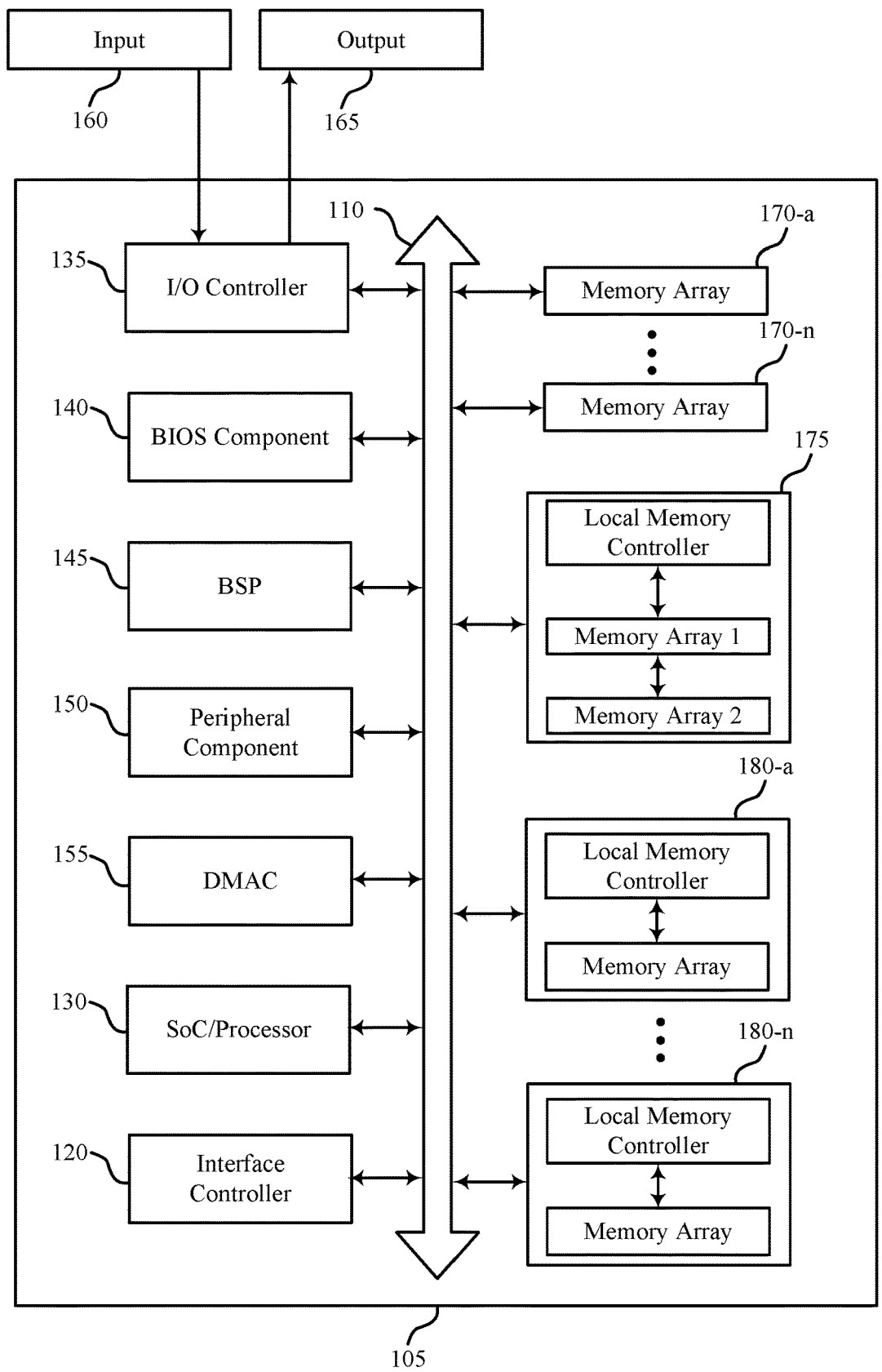
FIG. 1 shows a diagram of a system including a non-volatile memory system or sub-system that supports memory buffer management and bypass in accordance with examples of the present disclosure.

A memory system may utilize different memory technologies to store data. For example, a memory system may include a memory device, such as a main memory, for a system on chip (SoC) or processor (or "SoC/processor"). The memory device may include an array of non-volatile memory cells (e.g., FeRAM cells). Although the non-volatile memory array may provide benefits such as higher storage capacity and lower power consumption, one or more aspects of the non-volatile memory array may lack direct compatibility with corresponding aspects of the SoC/processor. Thus, the system may benefit from an interface controller to account for different latencies associated with access operations (e.g., read or write operations) or different page sizes. By utilizing the interface controller to selectively manage various interactions between the SoC/processor and the memory device, overall system performance may be improved. For example, the interface controller may be in communication with the non-volatile memory array and a buffer (e.g., an emerging memory sub-system (EMSS) buffer). By selectively communicating data in the buffer, the interface controller may retrieve data from the buffer in response to an access operation by the SoC/processor, which may improve read latency and reduce power consumption of the system.

In some examples, a virtual memory bank may receive data from a memory array, which may be a non-volatile memory (e.g., a ferroelectric random-access (FeRAM)) array. Non-volatile memory arrays commonly use smaller page sizes (e.g., 64 bytes, 128 bytes, 192 bytes, or 256 bytes) than a DRAM array and, unlike a DRAM array, the non-volatile array may access one or more portions (e.g., 64 byte portions) of a memory page.

The virtual memory bank may be configured to store data according to a second, larger page size larger than the memory array (e.g., 2048 bytes). In some examples, the memory array, despite having a smaller page size, may have a larger storage capacity than the virtual memory bank. An SoC/processor that operates according to certain memory access protocols may have direct access to the virtual memory bank and indirect access to the memory array (e.g., via an interface controller). In some examples, the SoC/processor perceives the memory system as a single memory array and sends access requests using a certain memory access protocol (e.g., a DRAM memory access protocol). An interface controller may interpret access requests from the SoC/processor and provide it with the requested data. In some cases, data stored in the virtual memory bank may be accessed using, and within, the specifications of the memory access protocol used by the SoC/processor. Conversely, data stored in the memory array may not be accessible within the specification of the memory access protocol used by the processor—e.g., due to the memory array using an alternative memory technology. Regardless of whether the data is accessible, retrieving data stored in the memory array may be associated with higher latencies.

In some examples, the memory system may include a memory buffer (which may be referred to as a "buffer"), in addition to the memory bank and the memory array. By selectively storing data in the buffer, issues of high latency and inaccessible data stored at the memory array may be avoided. For example, high latency associated with communicating data from a memory array to the SoC/processor may be avoided by selectively storing data to the buffer, and transferring the data from the buffer to the SoC/processor. To selectively store data to the buffer, the system may utilize one or more counters to aid processes and track conditions and operations. For example, a first counter may be implemented at a virtual memory bank. During an access operation (e.g., related to the virtual memory bank or the non-volatile memory), the first counter may be incremented. Once the counter exceeds a threshold value, the data may be communicated from the virtual memory bank to the buffer based on one or more operations (e.g., which may in some cases be initiated by a memory controller). Thus, the counter may aid the system in recognizing commonly-accessed data, while improving overall power consumption and latencies associated with requests from the SoC/processor.

Features of the disclosure introduced above are further described below at an exemplary system level in the context of FIG. 1. Specific examples of memory systems and operations are then described in the context of FIGS. 2 through 4. These and other features of the disclosure are further illustrated by and described with reference to the apparatus diagrams of FIGS. 5 and 6, which describe various components, as well as flowcharts of FIGS. 7 through 13 that relate to operations of memory buffer management and bypass.

FIG. 1 shows a diagram of a system 100 including a memory system or sub-system that supports memory buffer management and bypass in accordance with examples of the present disclosure. System 100 may include a device 105. The device 105 may include an interface controller 120, an SoC or processor 130, and various memory devices 170, 175, and 180. Device 105 may also include an input/output controller 135, a basic input/output system (BIOS) component 140, a board support package (BSP) 145, peripheral component(s) 150, and a direct memory access controller (DMAC) 155. The components of device 105 may be in electronic communication with one another through a bus 110.

Device 105 may be a computing device, electronic device, mobile computing device, or wireless device. Device 105 may be a portable electronic device. For example, device 105 may be a computer, a laptop computer, a tablet computer, a smartphone, a cellular phone, a wearable device, an internet-connected device, or the like. In some examples, device 105 may be configured for bi-directional wireless communication via a base station or access point. In some examples, device 105 may be capable of machine-type communication (MTC), machine-to-machine (M2M) communication, or device-to-device (D2D) communication. Device 105 may be referred to as a user equipment (UE), station (STA), mobile terminal, or the like.

Interface controller 120 may be configured to interface with SoC/processor 130, and may be referred to as a first controller and may initiate reading data corresponding to the page size of the memory array. Interface controller 120 may also be configured to interface with various memory devices 170, 175, 180, or any combination thereof.

SoC/processor 130 may be configured to operate with various memory devices 170, 175, 180, or any combination thereof—either directly or via interface controller 120. In some cases, SoC/processor 130 may perform some or all of the functions of interface controller 120 described herein. SoC/processor 130 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components.

Memory devices 170 may each include an array or arrays of memory cells to store digital information. Memory devices 170 may be configured to each operate with SoC/processor 130 and/or interface controller 120. In some examples, memory devices 170 may be configured to provide buffer memory for a memory bank for SoC/processor 130 or interface controller 120. Device 105 may include any number of memory devices 170.

Memory device 175 may include an array of memory cells and a local memory controller configured to operate with the array of memory cells. The array of memory cells included in memory device 175 may be structured in two or more tiers of memory having different performance characteristics. The local memory controller of memory device 175 may also be configured to operate with SoC/processor 130 or interface controller 120. In some examples, first-tier memory cells may be 3D XPoint™ memory, which may provide a high number of input/output operations per second (IOPS) with a short response time to handle various workloads. In some examples, second-tier memory cells may be three-dimensional Not-AND (NAND) memory, which may provide high capacity for data storage at a relatively lower cost than the first-tier memory cells. The local memory controller of memory device 175 may be configured to facilitate the efficient operation of memory cells within memory device 175, which may have different characteristics among memory cells in the two or more tiers, with SoC/processor 130. Memory device 175 may include other types or combinations of memory arrays in some cases. In some examples, one or more memory devices 175 may be present in device 105.

Memory devices 180 may include one or more arrays of memory cells and a local memory controller configured to operate with the one or more arrays of memory cells. The local memory controller of memory device 180 may also be configured to operate with SoC/processor 130 or interface controller 120. A memory device 180 may include non-volatile memory cells, volatile memory cells, or a combination of both non-volatile and volatile memory cells. A non-volatile memory cell (e.g., an FeRAM memory cell) may maintain its stored logic state for an extended period of time in the absence of an external power source, thereby reducing or eliminating requirements to perform refresh operations (e.g., refresh operations such as those associated with DRAM cells).

The inclusion of an array of non-volatile memory cells (e.g., FeRAM memory cells) in a memory device 180 may provide various benefits (e.g., efficiency benefits) for device 105. Such benefits may include near-zero standby power (which may increase battery life), instant-on operation following a standby or un-powered (e.g., "off") state, and/or high areal memory density with low system power consumption relative to an array of volatile memory cells. Such features of non-volatile memory system or sub-system may, for example, support the use of computationally intensive (e.g., desktop applications) operations or software in mobile environments. In some examples, one or more memory devices 180 may be present in device 105. In some cases, device 105 may include multiple kinds of non-volatile memory arrays employing different non-volatile memory technologies, such as one or more FeRAM arrays along with one or more non-volatile memory arrays using other memory technologies. Further, the benefits described herein are merely exemplary, and one of ordinary skill in the art may appreciate further benefits.

In some cases, a memory device 180 may use a different page size than SoC/processor 130. In the context of a memory device, a page size may refer to a size of data handled at various interfaces, and different memory device types may have different page sizes. In some examples, SoC/processor 130 may use a DRAM page size (e.g., a page size in accord with one or more JEDEC low power double data rate (LPDDR) specifications), and a device 180 within device 105 may include an array of non-volatile memory cells that are configured to provide a different page size (e.g., a page size smaller than a typical DRAM page size). In some examples, a memory device 180 may support a variable page size—e.g., a memory device 180 may include an array of non-volatile memory cells (e.g., an FeRAM array) that supports multiple page sizes, and the page size used may vary from one access operation to another—and the local memory controller of memory device 180 may be configured to handle a variable page size for a memory array within memory device 180. For example, in some cases, a subset of non-volatile memory cells connected to an activated word line may be sensed simultaneously without having to sense all non-volatile memory cells connected to the activated word line, thereby supporting variable page-size operations within memory device 180. In some cases, the page size for an array of non-volatile memory cells may vary dynamically depending on the nature of an access command and a characteristic of (e.g., size or associated latency) associated data (e.g., data subject to the access command). Smaller page size may provide benefits (e.g., efficiency benefits) as a smaller number of memory cells may be activated in connection with a given access operation. The use of variable page size may provide further benefits to device 105, such as configurable and efficient energy usage when an operation is associated with a small change in information by reducing the page size while supporting a high-performance operation by increasing the page size when desired.

In some examples, device 105 may employ one or more counters to determine which data will be transferred from a virtual memory bank to a buffer (e.g., an EMSS buffer). For instance, interface controller 120 may receive a read command from a host (e.g., an SoC/processor). To satisfy the command, interface controller 120 may attempt to transfer the requested data from the virtual memory bank to the host. After receiving the command from the host, a counter associated with the interface controller 120 may be incremented and, if the requested data is stored at the virtual memory bank, the data may be transferred to the host. Once the counter associated with the interface controller 120 reaches a threshold value (e.g., it becomes saturated based on being incremented a predetermined number of times), the data requested by the host may be communicated from the virtual memory bank to the buffer. Thus, incrementing the counters in response to an access command may indicate that certain data may be accessed more frequently. Accordingly, such data may be transferred from the buffer directly to the host, which may improve overall latency of the operation.

In some examples, device 105 may employ a second counter to track read operations associated with memory device 175, and relatedly aid in determining which data will be transferred from a virtual memory bank to a buffer (e.g., an EMSS buffer). As described above, interface controller 120 may receive a read command from a host, and may attempt to transfer the requested data from the virtual memory bank to the host. If the requested data is not stored at the virtual memory bank, the interface controller 120 may request the data from memory device 175. After receiving the request from the interface controller 120, a counter associated with the memory device 175 itself may be adjusted (e.g., incremented) and the data may be transferred to the virtual memory bank. Once the counter associated with the memory device 175 reaches a threshold value (e.g., it becomes saturated being incremented a predetermined number of times), the data requested by the host may be communicated from the virtual memory bank to the buffer. Thus, when the interface controller 120 receives subsequent read commands from the host, the interface controller may satisfy the command by transferring the data from the buffer to the host. As described above, the latency of the operation may be improved by transferring the data from the buffer directly to the host.

DMAC 155 may support direct memory access (e.g., read or write) operations by SoC/processor 130 with respect to memory devices 170, 175, or 180. For example, DMAC 155 may support access by SoC/processor 130 of a memory device 170, 175, or 180 without the involvement or operation of interface controller 120.

Peripheral component(s) 150 may be any input or output device, or an interface for any such device, that may be integrated into device 105. Examples of peripheral component(s) 150 may include disk controllers, sound controllers, graphics controllers, Ethernet controllers, modems, universal serial bus (USB) controllers, serial or parallel ports, or peripheral card slots, such as peripheral component interconnect (PCI) or accelerated graphics port (AGP) slots. Peripheral component(s) 150 may also include other components understood by those skilled in the art as peripherals.

BIOS component 140 or board support package (BSP) 145 may be software components that include a basic input/output system (BIOS) operated as firmware, which may initialize and run various hardware components of system 100. BIOS component 140 or BSP 145 may also manage data flow between SoC/processor 130 and the various components, e.g., peripheral component(s) 150, input/output controller 135, etc. BIOS component 140 or BSP 145 may include a program or software stored in read-only memory (ROM), flash memory, or any other non-volatile memory. In some cases, BIOS component 140 and BSP 145 may be combined as a single component.

Input/output controller 135 may manage data communication between SoC/processor 130 and other devices, including peripheral component(s) 150, input devices 160, or output devices 165. Input/output controller 135 may also manage peripherals that are not integrated into device 105. In some cases, input/output controller 135 may include a physical connection or port to the external peripheral.

Input device 160 may represent a device or signal external to device 105 that provides input to device 105 or its components. In some cases, input device 160 may include a user interface or an interface with or between other devices (not shown in FIG. 1). In some cases, input device 160 may be a peripheral that interfaces with device 105 via peripheral component(s) 150 or is managed by input/output controller 135.

Output device 165 may represent a device or signal external to device 105 that is configured to receive output from device 105 or any of its components. For example, output device 165 may include a display, audio speakers, a printing device, or another processor on printed circuit board, etc. In some cases, output device 165 may be a peripheral that interfaces with device 105 via peripheral component(s) 150 or is managed by input/output controller 135.

The components of device 105 may be made up of general purpose or specialized circuitry designed to carry out their respective functions. This may include various circuit elements, for example, conductive lines, transistors, capacitors, inductors, resistors, amplifiers, or other active or passive elements configured to carry out the functions described herein.

Figure 2:
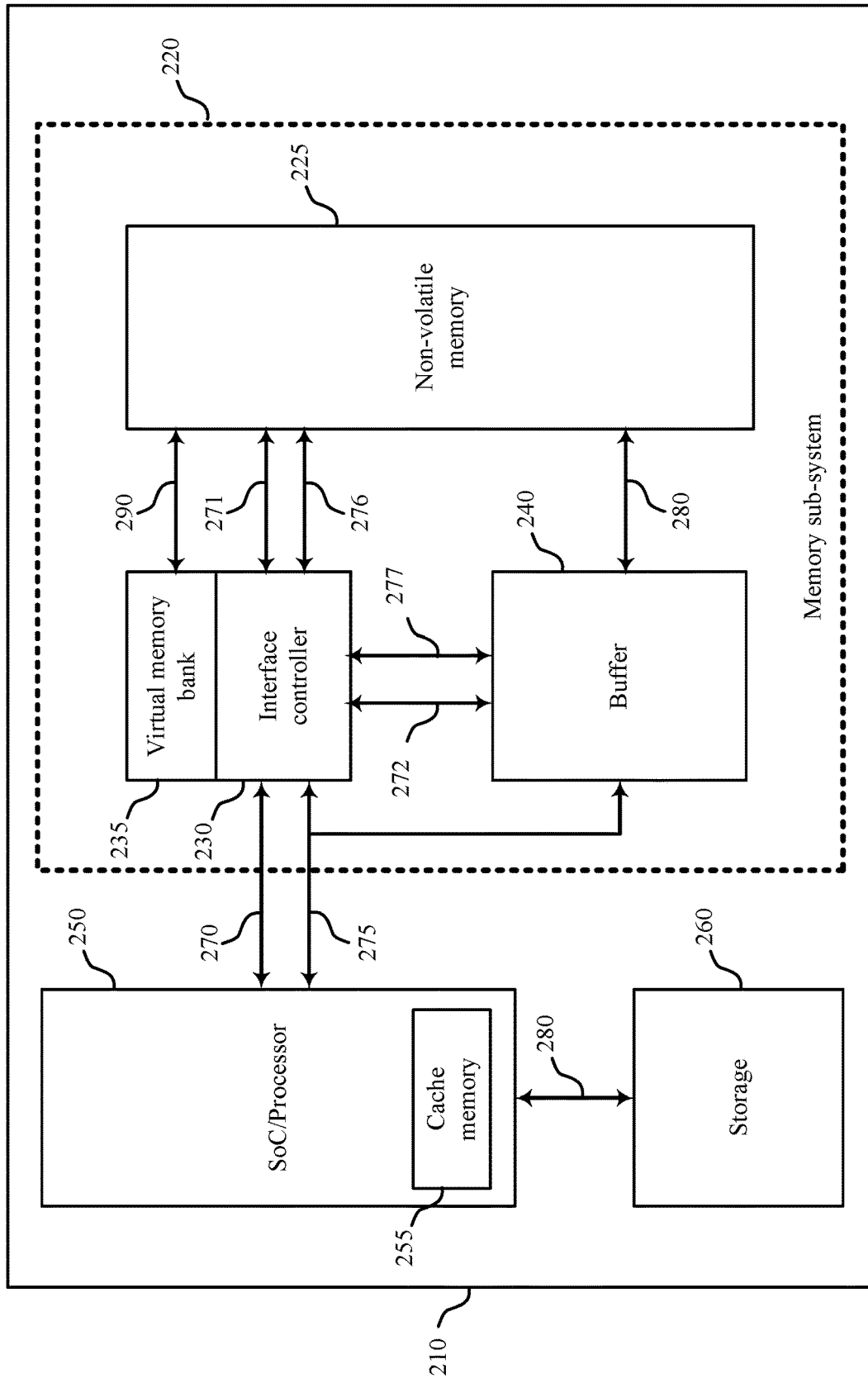
FIG. 2 illustrates an exemplary memory system or sub-system that supports memory buffer management and bypass in accordance with examples of the present disclosure.

FIG. 2 illustrates an exemplary system that supports memory buffer management and bypass in accordance with examples of the present disclosure. System 200 may include aspects of system 100 as described with reference to FIG. 1 and may include a device 210. Device 210 may include aspects of device 105 as described with reference to FIG. 1. Device 210 may include memory sub-system 220, SoC/processor 250, and storage 260. SoC/processor 250 may be an example of an SoC/processor 130 as described with reference to FIG. 1. Memory sub-system 220 may be an example of a memory device 180 as described with reference to FIG. 1. Storage 260 may be an example of a memory device 175 as described with reference to FIG. 1.

SoC/processor 250 may be configured to operate with storage 260 via a bus 280 and with memory sub-system 220 via buses 270 and 275. In some examples, bus 280 may be configured to support periphery component interconnect express (PCIe) signaling. In some examples, bus 270 may be configured to support LPDDR command and address (CA) signaling, and bus 275 may be configured to support LPDDR input/output (I/O) signaling. In some examples, a local memory array may be disposed on a same substrate as SoC/processor 250 and may be configured to function as a cache memory 255 for SoC/processor 250.

Memory sub-system 220 may include non-volatile memory 225 and interface controller 230. Non-volatile memory 225 may be an example of a memory device 180 as described with reference to FIG. 1. Interface controller 230 may be an example of an interface controller 120 as described with reference to FIG. 1. Interface controller 230 may be configured to operate with SoC/processor 250 via buses 270 and 275 pursuant to an LPDDR specification (e.g., page size, timing requirements). Interface controller 230 may include virtual memory bank 235, which may be an example of a memory device 170 as described with reference to FIG. 1. In some examples, virtual memory bank 235 may include DRAM memory cells and may be configured to operate pursuant to an LPDDR specification. In some examples, virtual memory bank 235 may be disposed on a same substrate as interface controller 230. In addition, interface controller 230 may be configured to operate with non-volatile memory 225 via buses 271 and 276.

In some examples, memory sub-system 220 may further include buffer 240. In some examples, buffer 240 may include DRAM memory cells. Buffer 240 may be an example of a memory device 170 or a memory device 180 as described with reference to FIG. 1. In addition, interface controller 230 may be configured to operate with buffer 240 via buses 272 and 277. In some examples, bus 272 may be a buffer CA bus. In some examples, bus 277 may be an interface (IF) buffer I/O bus. Interface controller 230 and buses 272 and 277 may be compatible with DRAM protocols. For example, interface controller 230 and buses 272 and 277 may utilize LPDDR page sizes and timings. In some examples, SoC/processor 250 may be configured to directly operate with buffer 240 via bus 275. In some examples, buffer 240 may be configured to have a page size compatible with bus 275, which may support direct access of buffer 240 by SoC/processor 250.

Buffer 240 may in some cases be configured to operate as a logical augmentation of cache memory 255 within SoC/processor 250. In some examples, the capacity of buffer 240 may be on the order of 256 M bytes. In some examples, the capacity of buffer 240 may be based on the size of cache memory 255 in SoC/processor 250. In some cases, buffer 240 may have a relatively small capacity, which may facilitate improved (e.g., faster) performance of memory sub-system 220 relative to a DRAM device of a larger capacity due to potentially smaller parasitic components, e.g., inductance associated with metal lines. A smaller capacity of buffer 240 may also provide benefits in terms of reducing system power consumption associated with periodic refreshing operations.

Memory sub-system 220 may be implemented in various configurations, including one-chip versions and multi-chip versions. A one-chip version may include interface controller 230, virtual memory bank 235, and non-volatile memory 225 on a single chip. In some examples, buffer 240 may also be included on the single-chip. In contrast, a multi-chip version may include one or more constituents of memory sub-system 220, including interface controller 230, virtual memory bank 235, non-volatile memory 225, and buffer 240, in a chip that is separate from a chip that includes one or more other constituents of memory sub-system 220. For example, in one multi-chip version, respective separate chips may include each of interface controller 230, virtual memory bank 235, and non-volatile memory 225. As another example, a multi-chip version may include one chip that includes both virtual memory bank 235 and interface controller 230 and a separate chip that includes buffer 240. Additionally, a separate chip may include non-volatile memory 225.

Another example of a multi-chip version may include one chip that includes both buffer 240 and virtual memory bank 235. Additionally, a separate chip may include both interface controller 230 and non-volatile memory 225 or respective separate chips may include each of interface controller 230 and non-volatile memory 225. In yet another example of a multi-chip version, a single chip may include non-volatile memory 225 and buffer 240. Additionally, a separate chip may include both interface controller 230 and virtual memory bank 235 or respective separate chips may include each of interface controller 230 and virtual memory bank 235. In some examples, non-volatile memory 225 may include both an array of non-volatile memory cells and an array of DRAM cells. In some cases of a multi-chip version, interface controller 230, virtual memory bank 235, and buffer 240 may be disposed on a single chip and non-volatile memory 225 on a separate chip.

In some examples, non-volatile memory 225 may include an array of non-volatile memory cells (e.g., FeRAM memory cells). The non-volatile array included in non-volatile memory 225 may be configured to support variable page sizes, which may in some cases differ from a page size associated with SoC/processor 250. Further, non-volatile memory 225 may be configured to determine a variable page size for non-volatile memory 225. Non-volatile memory 225 may be referred to as a non-volatile near memory to SoC/ processor 250 (e.g., in comparison to storage 260). In the context of a memory system, a near memory may refer to a memory component placed near SoC/processor 250, logically and/or physically, to provide a faster access speed than other memory components. Configuring non-volatile memory 225 as a near memory for SoC/processor 250 may, for example, limit or avoid overhead that may be associated with SoC/processor 250 retrieving data from storage 260. SoC/processor 250 may store critical information in non-volatile memory 225 upon occurrence of an unexpected power interruption—e.g., instead of accessing storage 260, as accessing storage 260 may be associated with an undesired delay. In some cases, non-volatile memory 225 may include a local memory controller (not shown), which may facilitate various operations in conjunction with interface controller 230 or perform some functions ascribed herein to interface controller 230.

Interface controller 230 may be configured to operate with non-volatile memory 225 via buses 271 and 276. In some examples, bus 271 may be an FeRAM CA bus, and bus 276 may be an FeRAM interface (IF) bus. Interface controller 230 and buses 271 and 276 may be compatible with the page size of non-volatile memory 225. In some examples, bus 280 may be configured to facilitate data transfer between buffer 240 and non-volatile memory 225. In some examples, bus 290 may be configured to facilitate data transfer between non-volatile memory 225 and virtual memory bank 235.

Interface controller 230 may support low latency or reduced power operation (e.g., from the perspective of SoC/processor 250) by leveraging virtual memory bank 235 or buffer 240. For example, upon receiving a read command from SoC/processor 250, interface controller 230 may attempt to retrieve data from virtual memory bank 235 or buffer 240 for transmission to SoC/processor 250. If data subject to the read command is not present in virtual memory bank 235 or buffer 240, interface controller 230 may retrieve data from non-volatile memory 225 to store the data in virtual memory bank 235 and also (e.g., concurrently) send the data to SoC/processor 250.

Retrieving data from non-volatile memory 225 may be associated with increased latency compared to retrieving data from virtual memory bank 235 or buffer 240. In some examples, a counter associated with the virtual memory bank 235 or the non-volatile memory 225 may be incremented based on an access operation (e.g., a read operation), which may result in data being communicated from the virtual memory bank 235 to the buffer 240. This may result in the memory access throughput of device 210 being increased as the processor 250 may access data stored in the buffer 240 directly (e.g., as opposed to receiving the data from non-volatile memory 225 via virtual memory bank 235).

Interface controller 230 may reduce power consumption and latency by communicating data stored at virtual memory bank 235 to the buffer 240. For example, interface controller 230 may receive a request for data from a host device (e.g., SoC/processor 250). If the data is stored at the virtual memory bank 235, the data may be communicated to the SoC/processor 250 and the request may be satisfied. A counter associated with the virtual memory bank 235 may also be incremented and subsequent data requests from the SoC/processor for the same or similar data may result in the counter being further-incremented. Once the counter associated with the virtual memory bank 235 reaches a threshold value (e.g., it becomes saturated), the data may be communicated from the virtual memory bank 235 to the buffer 240. Thus, the interface controller 230 may satisfy future requests for data from SoC/processor 250 by communicating the data from the buffer 240. In this way, the use of the counter associated with the virtual memory bank 235 may allow for data to be selectively communicated from the virtual memory bank 235 to the buffer 240. As described above, this process may improve latency associated with requests for data from the SoC/processor 250.

In other examples, interface controller 230 may receive a request for data from a host (e.g., SoC/processor 250), and the data may not be stored at the virtual memory bank 235. In such an example, the interface controller 230 (among other components) may request the data from non-volatile memory 225. The data may be communicated from the non-volatile memory 225 to the interface controller 230, and may be further communicated to the SoC/processor 250. This process may satisfy the data request by the SoC/processor 250. A counter associated with the non-volatile memory 225 may be incremented based on the interface controller 230 requesting data from non-volatile memory 225. Subsequent data requests from the SoC/processor for the same or similar data (e.g., from the non-volatile memory 225) may result in the counter being further incremented. Once the counter associated with the non-volatile memory 225 reaches a threshold value (e.g., it becomes saturated), the data may be communicated from the non-volatile memory 225 to the virtual memory bank 235, and from the virtual memory bank 235 to the buffer 240. As described above, the interface controller 230 may satisfy future requests for data from SoC/processor 250 by communicating the data from the buffer 240, which may improve latency associated with requests for data from the SoC/processor 250.

Interface controller 230 may manage operations of virtual memory bank 235. For example, interface controller 230 may use a set of flags located in virtual memory bank 235 to identify portions of virtual memory bank 235 storing valid data from non-volatile memory 225. As another example, upon receiving a write command from SoC/processor 250, interface controller 230 may store data at virtual memory bank 235. Another set of flags located in virtual memory bank 235 may indicate which portions of virtual memory bank 235 store valid data that are modified from corresponding contents of non-volatile memory 225. Valid data stored at virtual memory bank 235 may include data that have been retrieved from non-volatile memory 225 pursuant to a read command from SoC/processor 250 or data that have been received from SoC/processor 250 as a part of write command. Flags indicating which portions of virtual memory bank 235 store valid data or modified data may support interface controller 230 in saving only the data that has been modified from the corresponding contents in non-volatile memory 225. Furthermore, interface controller 230 may determine where to store data upon removal from virtual memory bank 235 (e.g., when SoC/processor 250 no longer needs the data). Interface controller 230 may monitor and identify the contents of virtual memory bank 235.

In some cases, interface controller 230 may include a counter that records a number of access attempts by SoC/processor 250 to the contents of virtual memory bank 235 during a certain time interval. By way of example, if the counter shows that the number of access attempts by SoC/processor 250 during the time interval is less than a predetermined threshold value, then upon removal of the data from virtual memory bank 235, interface controller 230 may store modified data (that is, data that was modified by the access attempts by SoC/processor 250) in non-volatile memory 225, as the interface controller 230 may anticipate, based on the relatively low number of prior access attempts, that SoC/processor 250 is not likely to access the data again for some duration of time. Or, if the counter indicates that the number of access attempts by SoC/processor 250 during the time interval is equal to or larger than the pre-determined threshold value, then interface controller 230 may, upon removal of the data from virtual memory bank 235, store the data in buffer 240, as the interface controller 230 may anticipate that SoC/processor 250 is likely to access the data soon. One skilled in the art may, in view of overall system requirements, devise various criteria (e.g., criteria including the threshold value of the counter, a clock, a value of the time interval, etc.) for interface controller 230 to use in making such determinations.

In some examples, interface controller 230 may record a number of access attempts by SoC/processor 250 by incrementing a counter associated with the virtual memory bank 235. Interface controller 230 may transmit the portions, or subpages, to the buffer 240 based on the counter reaching or exceeding a threshold value. For example, interface controller 230 may transmit portions, or subpages, to buffer 240 that have been accessed at least a threshold number of times, and may discard or writeback to non-volatile memory 225 portions, or subpages, that have not been accessed the threshold number of times.

In addition, interface controller 230 may set up a by-pass indicator based on the counter when the number of access attempts by SoC/processor 250 is less than the pre-determined threshold value in order to bypass saving the contents of virtual memory bank 235 to buffer 240. Then, interface controller 230 may directly save the modified contents of virtual memory bank 235 to non-volatile memory 225 based on the bypass indicator. In some cases, upon removal of the data from virtual memory bank 235, interface controller 230 may determine that the data has not been modified since it was last retrieved from non-volatile memory 225 and may, based on that determination, discard the data (e.g., not write the data to either buffer 240 or non-volatile memory 225).

In some examples, a virtual memory bank 235 may be configured to receive data corresponding to a page size (e.g., 64, 128, 192, or 256 bytes) of a memory array of the device (e.g., non-volatile memory 225). In some cases, a value of a first counter associated with the virtual memory bank 235 may be incremented based on a memory access operation (e.g., based on a request received from a host device, such as an SoC/processor) associated with the data. The interface controller 230 may determine that the value of the first counter associated with the virtual memory bank 235 satisfies a threshold and may communicate the data between the virtual memory bank 235 and a buffer 240 of the device based on the first counter satisfying the threshold.

In other examples, a value of a second counter associated with the memory array (e.g., non-volatile memory 225) may be incremented based on receiving a request for data from the interface controller 230. In some examples, the second counter may be incremented by interface controller 230. In other examples, the second counter may be incremented by a local memory controller associated with non-volatile memory 225. The virtual memory bank 235 may determine that a value of the second counter associated with the memory array satisfies the threshold and may communicate the data between the virtual memory bank 235 and the buffer 240 of the device based on the second counter satisfying the threshold.

Virtual memory bank 235 may be configured to increment a respective counter based on each data request. For example, the virtual memory bank 235 may be configured to increment a counter based in part on a data request that corresponds to a specific page size (e.g., 64, 128, 192, or 256 bytes) or a specific portion of a memory page. The virtual memory bank 235 may include (and may, in some cases, correspondingly increment) a respective counter for each memory page, or for each memory subpage in the memory array, or both. In other examples, the interface controller 230 may be configured to increment a respective counter based on each data request. In other examples, a local memory controller associated with non-volatile memory 225 may be configured to increment a respective counter based on each data request.

In some cases, memory sub-system 220 may include means, such as virtual memory bank 235, for receiving data corresponding to a page size of a memory array of the device. Memory sub-system 220 may include means, such as interface controller 230, for incrementing a value of a first counter associated with the virtual memory bank based on a memory access operation associated with the data. Memory sub-system 220 may include means, such as interface controller 230, for determining that the value of the first counter associated with the virtual memory bank satisfies a threshold. Memory sub-system 220 may include means, such as interface controller 230, for communicating the data between the virtual memory bank 235 and a buffer 240 of the device based on the first counter satisfying the threshold.

Additionally, memory sub-system 220 may include means, such as interface controller 230, for setting the value of the first counter to an initial value based on communicating the data between the virtual memory bank 235 and the buffer 240. Memory sub-system 220 may also include means, such as interface controller 230, for receiving a write command from a host device (e.g., SoC/processor 250), and the value of the first counter associated with the virtual memory bank 235 may be incremented based on receiving the write command. Memory sub-system 220 may also include means, such as interface controller 230, for determining that the value of the first counter associated with the virtual memory bank 235 does not satisfy the threshold before determining that the value of the first counter associated with the virtual memory bank 235 satisfies the threshold. Memory sub-system 220 may also include means, such as interface controller 230, for communicating the data between the virtual memory bank 235 and the memory array based on determining that the value of the first counter does not satisfy the threshold. Memory sub-system 220 may also include means, such as interface controller 230, for receiving a read command from a host device, wherein the value of the first counter associated with the virtual memory bank 235 is incremented based on receiving the read command.

In other examples, memory sub-system 220 may include means, such as interface controller 230, for incrementing a value of a second counter associated with the memory array based on the virtual memory bank 235 receiving the data. In some examples, memory sub-system 220 may include means, such as a local memory controller associated with the non-volatile memory 225, for incrementing a value of a second counter associated with the memory array based on the virtual memory bank 235 receiving the data. Memory sub-system 220 may also include means, such as interface controller 230, for determining that a value of the second counter associated with the memory array satisfies the threshold. In some examples, memory sub-system 220 may include means, such as a local memory controller associated with the non-volatile memory 225, for determining that a value of the second counter associated with the memory array satisfies the threshold. Memory sub-system 220 may also include means, such as interface controller 230, for communicating the data between the virtual memory bank 235 and the buffer 240 of the device based on the second counter satisfying the threshold.

Additionally or alternatively, for example, memory sub-system 220 may include means, such as interface controller 230, for determining that the value of the second counter associated with the memory array does not satisfy the threshold before determining that the value of the second counter associated with the memory array satisfies the threshold. Memory sub-system 220 may also include means, such as interface controller 230, for communicating the data between the virtual memory bank 235 and the memory array based on determining that the value of the second counter does not satisfy the threshold.

Figure 3A:
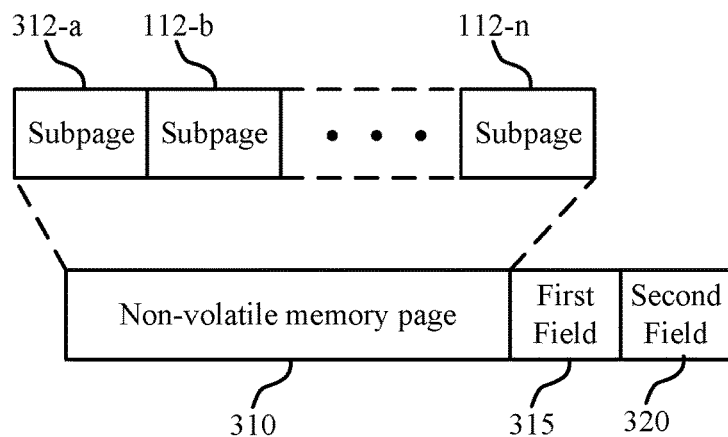
FIGS. 3A and 3B illustrate an exemplary data structure and a state diagram that supports memory buffer management and bypass in accordance with examples of the present disclosure.

FIG. 3A illustrates an example of a data structure 300-*a* that supports memory buffer management and bypass in accordance with examples of the present disclosure. Data structure 300-*a* illustrates a non-volatile memory page 310, a first field 315, and a second field 320.

Non-volatile memory page 310 may be used to store a designated amount of data. For instance, the non-volatile memory page 310 may be 128 or 256 bytes. Non-volatile memory page 310 may include a number of subpages, such as subpage 312-*a*, subpage 312-*b*, and subpage 312-*n*. Each subpage may be 64 bytes. In some examples, the subpages may be grouped as portions.

In some examples, the second field 320 may be configured to indicate a size of data in a corresponding non-volatile memory page 310 to be retrieved upon receiving a read command. The size of data may be determined by an access pattern to the data made by an SoC/processor in one or more previous access operations and referred to as a prefetch size in some cases. A prefetch size may be an amount of data that is to be read in response to a read command for data included in the non-volatile memory page 310. For example, if data from the non-volatile memory page 310 is subject to a read command (e.g., a read command from the interface controller 230 accessing the non-volatile memory page 310, anticipating an access from an SoC/processor), the interface controller (or the interface controller in conjunction with a local memory controller) may identify the associated second field 320 and may determine a prefetch size for the requested data based on the associated second field 320, where the prefetch size indicates a size of data (that includes and thus is at least as large as the requested data) to be read from the non-volatile memory 225 in response to the read request.

In some examples, logic states stored in the second field 320 may indicate a prefetch size of the corresponding non-volatile memory page 310. For example, "00" may correspond to 64 bytes, "01" may correspond to 128 bytes, "01" may correspond to 192 bytes, and "11" may correspond to 256 bytes. In such an example, if a read command requests 64 bytes of data from a non-volatile memory page 310, and the associated second field 320 is 01, then the interface controller (or the interface controller in conjunction with a local memory controller) may identify the prefetch size for the requested data as 192 bytes and read from the non-volatile memory 225 192 bytes of data, where the 192 bytes includes the requested 64 bytes. It is to be understood that the second field 320 may include any number of bits supporting any number of logic states and may indicate prefetch sizes of any size. In some examples, the second field 320 may be referred to as a prefetch (PF) counter.

In some examples, an interface controller (e.g., interface controller 230 described with reference to FIG. 2, not shown in FIGS. 3A and 3B) may use a set of mode register bits to facilitate the SC and PF counter functionality of a non-volatile memory (e.g., non-volatile memory 225 described with reference to FIG. 2). In some examples, mode registers may establish various operation modes (e.g., different test modes, different read or write modes, different performance modes) of a memory device and a set of bits associated with mode registers, which may be referred to as mode register bits, may be used to determine a particular mode of operation.

In some examples, an interface controller may access the contents of the SC and PF counter using a data mask inversion (DMI) pin along with data during a read operation. In some examples, an interface controller may write the contents of the SC and PF counter with a special command sequence. For example, an interface controller may provide the contents of SC and PF counter to registers associated with the SC and PF counter via column address pins during a write command issued to a non-volatile memory (e.g., non-volatile memory 225 described with reference to FIG. 2).

Figure 3B:
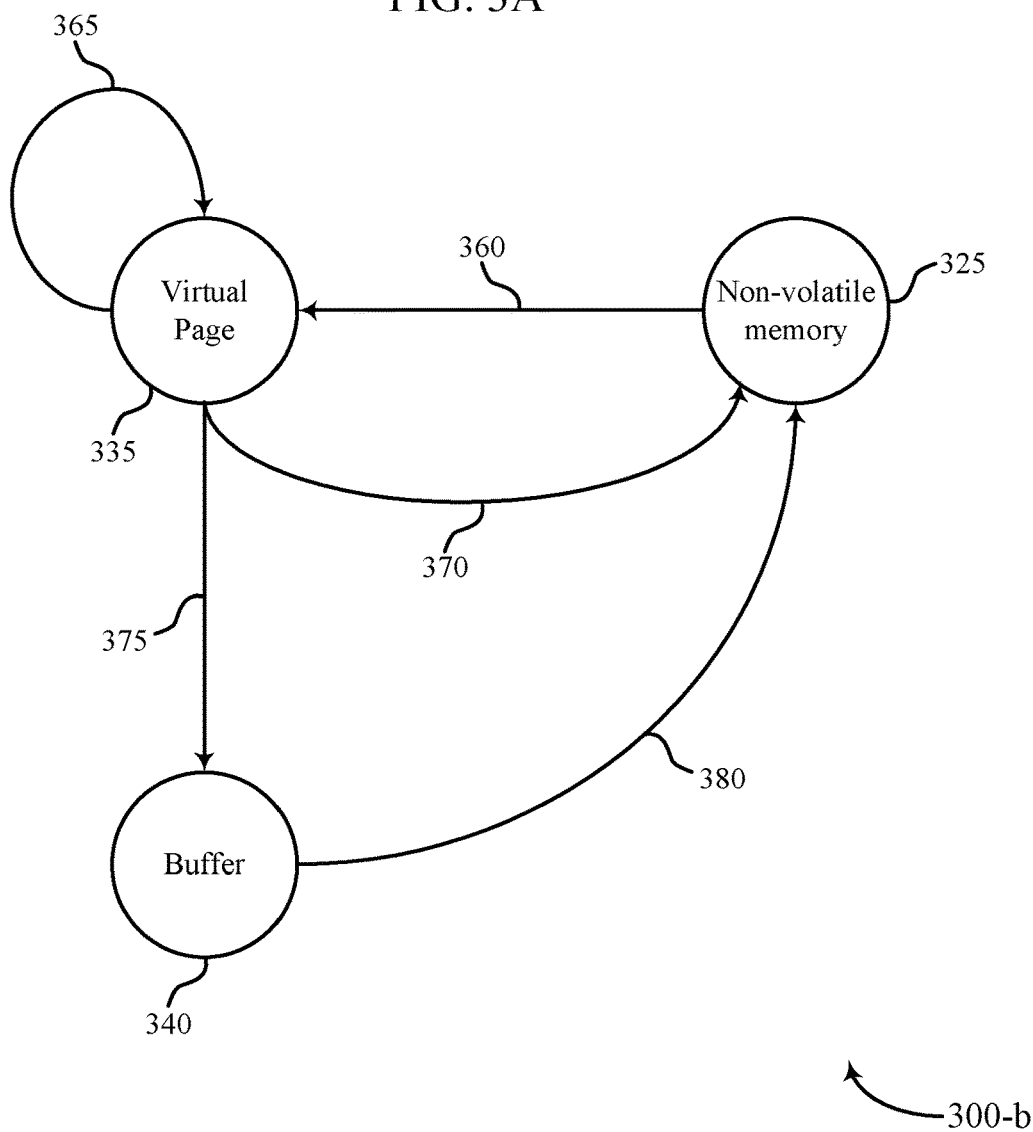

FIG. 3B illustrates an example of a state diagram 300-*b* that supports memory buffer management and bypass in accordance with examples of the present disclosure. Diagram 300-*b* illustrates exemplary operational characteristics of a memory system or sub-system that support features and techniques as described herein. Diagram 300-*b* illustrates non-volatile memory 325, virtual page 335, and buffer 340. Non-volatile memory 325 may be an example of non-volatile memory 225 described with reference to FIG. 2.

Virtual page 335 may be a page within virtual memory bank 235 described with reference to FIG. 2. In some examples, virtual memory bank 235 may be a superset of multiple virtual pages 335. Buffer 340 may be an example of buffer 240 described with reference to FIG. 2. An interface controller (e.g., interface controller 230 described with reference to FIG. 2, not shown in FIGS. 3A and 3B) may perform or manage various operations (e.g., operations 360 through 380) associated with non-volatile memory 325, virtual page 335, and buffer 340. In some cases, an interface controller may manage an operation by requesting another entity (e.g., a local memory of a memory device) to perform the operation.

Operation 360 may include transmitting the contents of a non-volatile memory page 310 from non-volatile memory 325 to virtual page 335 and storing the contents in virtual page 335. Operation 360 may be carried out by the interface controller in conjunction with a local memory controller (e.g., a local memory controller of a memory device) when an SoC/processor requests data corresponding to the contents of non-volatile memory page 310 that is not present either in the virtual page 335 or the buffer 340. Additionally, the interface controller may as part of operation 365 update a value of the first field 315 (e.g., a value of a first counter) associated with the virtual page 335, in order to track a number of access events by the SoC/processor for the non-volatile memory page 310.

In some examples, operation 360 may include an interface controller receiving a request from a host (e.g., an SoC/processor). Based on the request, the interface controller may first communicate with the virtual page 335 for the requested data. In the event that the data is not stored at the virtual page 335, the interface controller may signal to non-volatile memory 325 (e.g., to a local controller of non-volatile memory 325) to transmit the requested data to virtual page 335. This transmission may occur at operation 360. Upon transmitting the data from the non-volatile memory 325 to the virtual page 335, a counter associated with the non-volatile memory may be incremented. After incrementing the counter associated with the non-volatile memory, a determination may be made (e.g., by the interface controller), whether the counter has reached a threshold value (e.g., whether the counter is saturated). If the counter has not reached a threshold value, the data may be provided to the host from the interface controller. In some examples, after the data is provided to the host, the data may be communicated back to (e.g., written back to) the non-volatile memory 325 (e.g., at operation 370). In some examples, communicating the requested data includes transmitting or accessing data corresponding to a at least a portion of a non-volatile memory page.

The interface controller may perform operation 365 when data requested by an SoC/processor (e.g., subject to a read command sent to the interface controller by the SoC/processor) is found in virtual page 335. As part of operation 365, the interface controller may retrieve the requested data from the virtual page 335 and provide the requested data to the SoC/processor without accessing either non-volatile memory 325 or buffer 340. Additionally, the interface controller may update a value of the first field 315 (e.g., a value of the first counter) associated with the data, in order to track a number of access events by the SoC/processor for the non-volatile memory page 310 as described above with reference to FIG. 3A.

The interface controller may perform operation 370 when a page in virtual page 335 is closed and a value of the second field 320 as described above with reference to FIG. 3A (e.g., a value of a second counter) associated with the closed page does not satisfy a threshold value. Virtual page 335 may include one or more pages within virtual memory bank 235 described with reference to FIG. 2. The interface controller may determine to close a page in virtual page 335 when the SoC/processor no longer needs the data associated with the page. Upon determining to close a page in virtual page 335, the interface controller may remove the data to make the memory space corresponding to the page available for the SoC/processor. In some examples, a page in virtual page 335 may be closed without having been written (e.g., the data is unmodified) to the SoC/processor. The unmodified data may evicted from the virtual page 335, and a value of the first field 315 as described above with reference to FIG. 3A (e.g., a value of the first counter) may not be written to memory bank 235.

In some examples, operation 365 may include an interface controller receiving a request from a host (e.g., an SoC/processor). When the request is received, the interface controller may communicate with the virtual page 335 for the requested data, as described above. In the event that the data is stored at the virtual page 335, the interface controller may communicate the data from the virtual page 335 to the host. Upon communicating the data from the virtual page 335 to the host, a counter associated with the virtual page 335 may be incremented at operation 365. This may be referred to as a first counter. After incrementing the counter, a determination may be made (e.g., by the interface controller), whether the first counter has reached a threshold value (e.g., whether the counter is saturated). If the counter has not reached a threshold value, the data may remain at the virtual page or, in some examples, may be communicated back to the non-volatile memory 325 at operation 370. If the counter has reached a threshold value, however, the data may be transferred to and stored at buffer 340 at operation 375.

Additionally or alternatively, data may or may not be communicated to the buffer 340 at operation 375 based on at least one characteristic associated with the data. In some examples, an interface controller may determine at least one characteristic associated with the data. For example, an interface controller may determine a quantity of memory access operations associated with the data. The characteristic of the data may be based on the quantity of memory access operations and the data may then be communicated (or not communicated) to the buffer based on the quantity of prior memory access operations exceeding a threshold. For example, to improve latency in an access operation, it may be desirable to store a particular type of data (e.g., GPU data) at the buffer 340. Thus if GPU data is accessed a number of times that exceeds a predetermined threshold, it may be stored at the buffer 340. Conversely, for example, if the GPU data is accessed a number of times that does not exceed the predetermined threshold, the data will not be stored at the buffer 340.

In another example, an interface controller may determine that the data is a type of data buffered at a SoC/processor. Thus the characteristic of the data may be based on the data being buffered at the SoC/processor and the data may be communicated to the memory array of the device based on determining that the data is buffered at the SoC/processor. Stated another way, it may be preferable to buffer certain types of data at the SoC/processor and not at the buffer 340. In some examples, the SoC/processor may indicate to the interface controller whether the data is a type buffered at the SoC/processor. Thus, if such data is identified (e.g., by interface controller), the data will not be stored at buffer 340, but rather returned to non-volatile memory 325. However, in some examples, data indicated by the SoC/processor to be buffered at the SoC/processor may still be communicated to the buffer 340.

An interface controller may also determine at least one application associated with the data. The characteristic of the data may be based on the application associated with the data, and the data may communicated to the buffer based on the characteristic. For example, to improve latency in an access operation, it may be desirable to store data of a particular application (e.g., a graphics-related application) at the buffer 340. In some examples, the type of application may be indicated to the interface controller by the SoC/processor. Thus if data associated with this particular type of application is received, it may be stored at the buffer 340.

In some cases, the interface controller may use a threshold value to determine how to dispose data from a closed page of virtual page 335. In some examples, when a value corresponding to first field 315 as described above with reference to FIG. 3A (e.g., a value of the first counter) is less than the threshold value, the interface controller may bypass saving data from a closed page to buffer 340. Instead, the interface controller may store any modified data from the closed page in non-volatile memory 325 and discard any unmodified data from the closed page. In such cases, the interface controller may determine whether data from a closed page includes a portion that the SoC/processor has modified relative to corresponding data stored in non-volatile memory 325. During operation 370, the interface controller may store any modified portion of the data of the closed page in non-volatile memory 325 from virtual page 335. Further, the interface controller may discard any unmodified data from a closed page after determining that the data has not been modified (that is, the interface controller may bypass storing an unmodified portion of the data in non-volatile memory 325). The interface controller may, in view of overall system requirements, determine the threshold value based on various criteria (e.g., a pre-determined value associated with a number of access to the page, a value of a time interval associated with lack of access to the page).

The interface controller may perform operation 375 when the interface controller determines to close a page in virtual page 335 and determines that a value of a first counter or a second counter satisfies a threshold value described above. In some examples, when a value of the first field 315 as described above with reference to FIG. 3A (e.g., a value of the first counter) is equal to or greater than the threshold value, the interface controller may save data from a closed page to buffer 340, as the interface controller may determine that the SoC/processor is likely to access the data soon. As such, as a part of operation 375, the interface controller may store data from the closed page in buffer 340. Similarly, the interface controller may determine that a value of a second field 320 as described above with reference to FIG. 3A (e.g., a value of the second counter) is equal to or greater than the threshold value. In some examples, when a respective value of the second field 320 as described above with reference to FIG. 3A is equal to or greater than the threshold value, the interface controller may save data from the non-volatile memory 325 to the buffer by way of the virtual page 335.

The interface controller may perform operation 380 when it evicts a page from buffer 340. The interface controller may determine to evict a page from buffer 340 when the page is not accessed by the SoC/processor for a predetermined duration. In some cases, data from an evicted page may include a portion that has been modified by the SoC/processor relative to corresponding data stored in non-volatile memory 325. In such cases, as a part of operation 380, the interface controller may store only a modified portion of the evicted data in non-volatile memory 325. Additionally, as part of operation 380, the interface controller may update (e.g., reset to zero) a value of the first field 315 as described above with reference to FIG. 3A (e.g., a value of the first counter) associated with the evicted page. Further, the interface controller may discard data after determining that the data has not been modified (that is, the interface controller may bypass storing an unmodified portion of the evicted data in non-volatile memory 325). Similarly, the interface controller may update (e.g., reset to zero) a value of a respective second field 320 as described above with reference to FIG. 3A (e.g., a value of the second counter) associated with an evicted page.

Figure 4A:
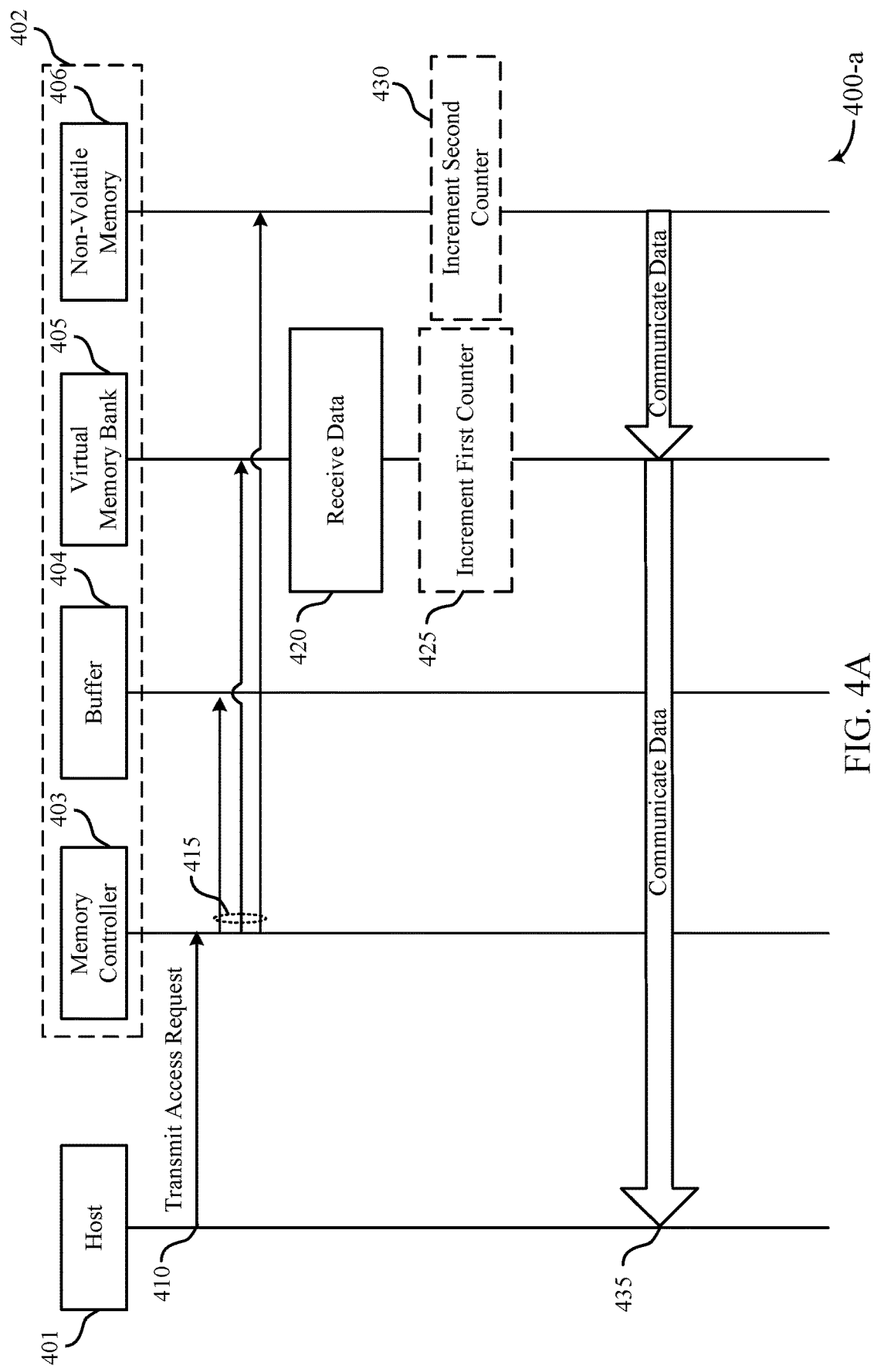
FIGS. 4A and 4B illustrate exemplary process flows for a main memory buffer management operation in accordance with examples of the present disclosure.

FIG. 4A illustrates an exemplary process flow 400-*a* for a memory buffer management and bypass operation in accordance with examples of the present disclosure. Process flow 400-*a* depicts aspects of a memory access operations involving a host 401, which may be an example of an SoC/processor as discussed with reference to FIG. 2, and memory sub-system 402 which may be an example of a memory sub-system as discussed with reference to FIG. 2. Memory sub-system 402 may include memory controller 403, which may be an example of interface controller 230 as described with reference to FIG. 2; buffer 404, which may be an example of a buffer as discussed with reference to FIGS. 2 and 3; virtual memory bank 405, which may be an example of a virtual memory bank or virtual page as discussed with reference to FIGS. 2 and 3; and non-volatile memory 406, which may be an example of a non-volatile memory as discussed with reference to FIGS. 2 and 3.

At 410, host 401 may transmit an access request for data (e.g., to read or write data) stored in memory sub-system 402. Host 401 may be or may be referred to as a SoC/processor. In some cases, the access request may be transmitted according to a certain memory access protocol (e.g., a DRAM memory access protocol). In some examples, the access request may be sent directly to components of memory sub-system 402. For example, the access request may be transmitted directly to buffer 404 and virtual memory bank 405, which may both operate according to a certain memory access protocol used by host 401. Additionally or alternatively, the access request may be sent indirectly to components of memory sub-system 402 (e.g., via a memory controller 403). For example, the memory controller 403 may access data stored at non-volatile memory 406 based on receiving the access request from host 401.

At 415, memory controller 403 may access the requested data based on receiving the access request from host 401. Memory controller may forward the access request received from host 401 to one or more of buffer 404, virtual memory bank 405, and non-volatile memory 406. In some cases, memory controller may forward the access request to buffer 404, then to virtual memory bank 405, and last to non-volatile memory 406—e.g., after determining the requested data is not in buffer 404 or virtual memory bank 405. In some cases, memory controller 403 may forward the access request only to non-volatile memory 406—e.g., after determining the requested data is not in buffer 404 or virtual memory bank 405.

At 420, data may be received at virtual memory bank 405 based on communication with one or more components such as non-volatile memory 406. For example, in response to the access request for data (e.g., 410), data may be received from non-volatile memory 406. In other examples, the data may already be located at virtual memory bank 405. In either case, at the buffer 404, virtual memory bank 405, the memory controller 403, or any combination thereof, may determine that the requested data is not located in buffer 404.

At 425 a first counter may be incremented. For example, the first counter may be incremented if the data from 420 was previously stored at virtual memory bank 405. In some examples, the counter may read "00" and, after incrementing at 425, may read "01." Stated another way, the first counter may be incremented in response to the virtual memory bank 405 receiving an access request for data from the host 401. In another example, at 430 a second counter may be incremented. For example, the second counter may be incremented if the data from 420 was communicated to the virtual memory bank 405 from the non-volatile memory 406. As described above, the counter may read "00" and, after incrementing at 450, may read "01." Stated another way, the second counter may be incremented in response to the non-volatile memory 406 communicating data, in response to the access request for data, to the virtual memory bank 405. In some examples, the first counter and second counter may be incremented by memory controller 403. In other examples, the first counter may be incremented by memory controller 403 and the second counter may be incremented by a local memory controller associated with non-volatile memory 406.

In some examples, the access request received from host 401 may be a command (e.g., a write command). For example, the write command may be received from the host device and the value of the first counter associated with the virtual memory bank 405 may be incremented (e.g., at 425) based on receiving the write command. In other examples, the access request may be a read command. For example, the read command may be received from the host device, and the value of the first counter associated with the virtual memory bank 405 may be incremented based on receiving the read command. As described below, in some examples, the data received at the virtual memory bank 405 based on the read command and subsequently communicated from the virtual memory bank 405 to the buffer 404 based on the read command.

In some examples 410 may illustrate a first access request for data. A threshold a threshold value for each counter may be greater than "01," where the requested data may be communicated to host 401 at 435. Stated another way, the requested data may be communicated to host 401 if the value for the first counter or the second counter exceeds "01." For example, if the first counter was incremented (e.g., at 425), the data may be communicated directly from the virtual memory bank 405 to the host 401 (e.g., via an interface controller). Alternatively, if the second counter was incremented (e.g., at 430), the data may be communicated from the non-volatile memory 406 to the virtual memory bank 405, and from the virtual memory bank 405 to the host 401 (e.g., via an interface controller).

Figure 4B:
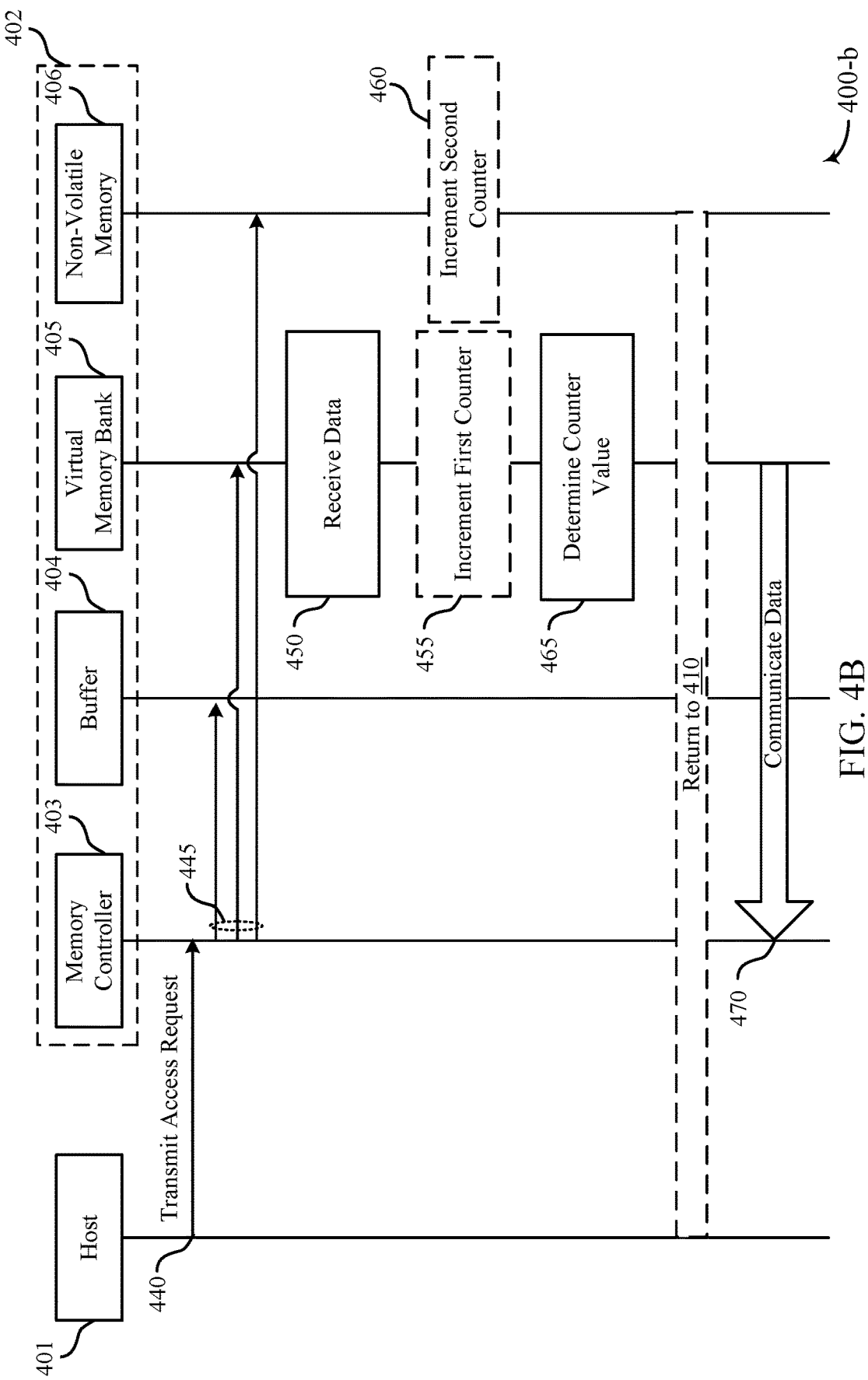

FIG. 4B illustrates an exemplary process flow 400-b for a memory buffer management and bypass operation in accordance with examples of the present disclosure. Process flow 400-b depict aspects of a memory access operation involving host 401 and memory sub-system 402, which may include memory controller 403, buffer 404, virtual memory bank 405, and non-volatile memory 406. The operations performed in process flow 400-b may be a follow on to the operations performed in process flow 400-a as discussed with reference to FIG. 4A.

At 440, host 401 may transmit a second access request for data (e.g., to read or write data) stored in memory sub-system 402. In some examples the access request at 440 may be a same request as at 410 as described with reference to FIG. 4A. In other examples, the access request at 440 may be a different request than at 410. As described above, the access request may be transmitted directly to buffer 404 and virtual memory bank 405, which may both operate according to the certain memory access protocol used by host 401.

At 445, memory controller 403 may access the requested data based on receiving the second access request from host 401. Memory controller may forward the second access request received from host 401 to one or more of buffer 404, virtual memory bank 405, and non-volatile memory 406. In some cases, memory controller may forward the second access request to buffer 404, then to virtual memory bank 405, and last to non-volatile memory 406—e.g., after determining the requested data is not in buffer 404 or virtual memory bank 405. In some cases, memory controller 403 may forward the second access request only to non-volatile memory 406—e.g., after determining the requested data is not in buffer 404 or virtual memory bank 405.

At 450, data may be received at virtual memory bank 405. As described above, the data may be received from non-volatile memory 406 (or, in some cases, may already be located at virtual memory bank 405). At 455 a first counter may be incremented. For example, the access request at 440 may be a same request as at 410 and the data may have been previously stored at virtual memory bank 405. Thus the a first counter may be incremented a second time. For example, the first counter may have previously read "01" and, after incrementing at 455, may read "10." At 460, a second counter may be incremented. For example, the access request at 440 may be a same request as at 410 and the data may have been communicated to the virtual memory bank 405 from the non-volatile memory 406. Thus, the second counter may be incremented a second time. For example, the second counter may have previously read "01" and, after incrementing at 460, may read "10." In other examples, either of the first counter or second counter may be incremented using-non binary digits. For example, the first counter or second counter may read "01" and, after incrementing, may read "02."

At 465, a value of either the first counter or the second counter may be determined. The determination may be based in part on whether the data was previously stored at virtual memory bank 405, or whether the data was transferred to the virtual memory bank 405 from the non-volatile memory 406. For example, the data may have been previously stored at virtual memory bank and may have been accessed twice by host 401, as described above. Thus, at 465, it may be determined that the value of the first counter is "10." Additionally or alternatively, the data may have been transferred to the virtual memory bank 405 from the non-volatile memory 406 twice, based on an access command by host 401, as described above. Thus, at 465, it may be determined that the value of the second counter is "10."

In other examples, at 465 it may be determined (e.g., by an interface controller) that the value of the first counter associated with the virtual memory bank 405 does not satisfy the threshold before determining that the value of the first counter associated with the virtual memory bank satisfies the threshold. In such an example, the data may be communicated between the virtual memory bank 405 and the non-volatile memory 406 based on determining that the value of the first counter does not satisfy the threshold. In another example, at 465 it may be determined (e.g., by an interface controller) that the value of the second counter associated with the memory array does not satisfy the threshold before determining that the value of the second counter associated with the memory array satisfies the threshold. In such an example, the data may be communicated between the virtual memory bank 405 and the non-volatile memory 406 based on determining that the value of the first counter does not satisfy the threshold.

At 470, the data may be communicated between the virtual memory bank 405 and a buffer 404 of the device based on the first counter satisfying the threshold. For example, the threshold value may be "10" and, as discussed above, the value of either the first counter or the second counter may read "10." Thus the value of either the first counter or the second counter may satisfy the threshold, and the data may be communicated to the buffer 404. However, in some examples, the value of the respective counter may not satisfy the threshold. In such an example, the data may be communicated to the host 401 and the process may return to a prior step (e.g., to 410).

Additionally or alternatively, after 470 (e.g., after data is communicated to the buffer 404), a controller (e.g., the interface controller) may set the value of the first counter to an initial value based on communicating the data between the virtual memory bank and the buffer. For example, the interface controller may set the value of the first counter to "00."

In some examples, 410, 420, 425, 430, and 435 may be omitted from process flow 400-a. For example, interface memory controller and/or non-volatile memory 406 may preemptively move non-volatile memory page and/or non-volatile memory sub-pages to virtual memory bank 405. In other examples, a first access operation (e.g., from host 401) may satisfy the threshold associated with either the first counter or the second counter.

Figure 5:
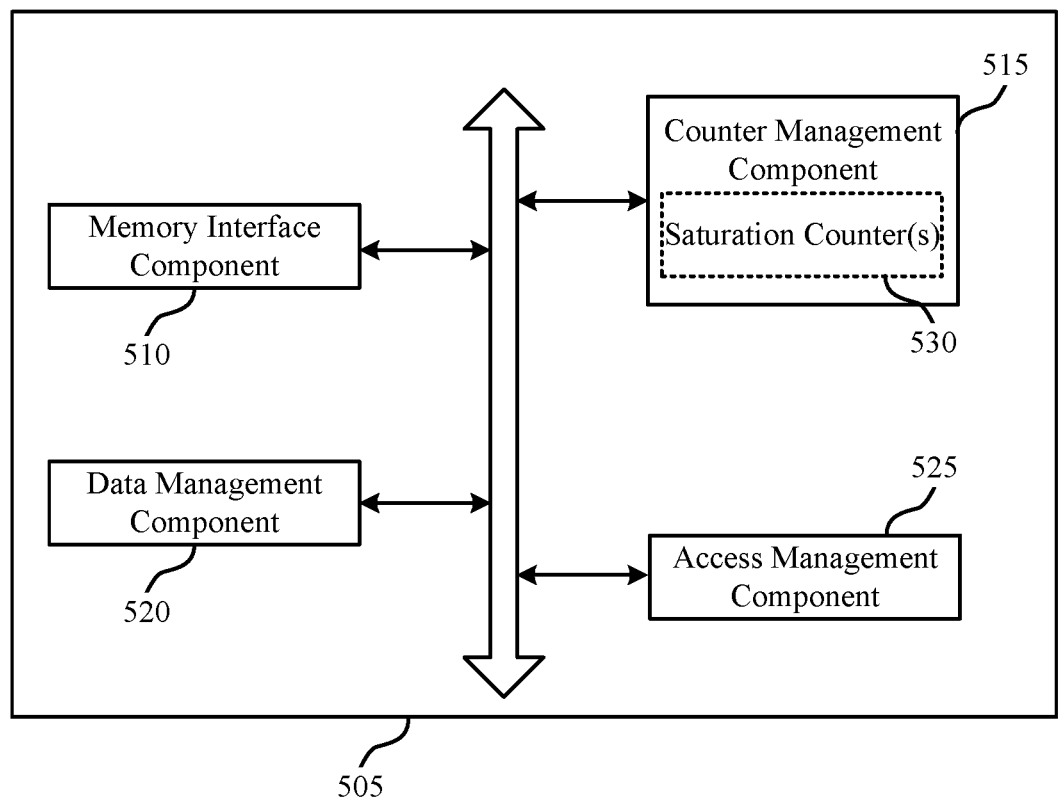
FIG. 5 illustrates a block diagram of a system that supports memory buffer management and bypass in accordance with examples of the present disclosure.

FIG. 5 shows a block diagram 500 of a memory controller 505 that supports memory buffer management and bypass in accordance with examples of the present disclosure.

Memory controller 505 includes memory interface component 510, counter management component 515, data management component 520, and access management component 525. Counter management component 515 may include saturation counter(s) 530. Each of these components may communicate, directly or indirectly, with one another (e.g., via one or more buses). In some examples, memory controller 505 manages operations across a memory sub-system (e.g., memory sub-system 220 as described with reference to FIG. 2). That is, memory controller 505 may manage or facilitate communications between a memory array, a virtual memory bank, and a buffer. For instance, memory controller 505 may cause certain components of a memory sub-system to write or read data.

Memory interface component 510 may manage commands received from a host device (e.g., SoC/processor 250 as described with reference to FIG. 2). For instance, memory interface component 510 may receive, from a host device, a read command or a write command associated with a virtual memory bank and/or a memory array that is coupled with memory interface component 510.

Counter management component 515 may increment counters associated with a virtual memory bank and/or a memory array based on a received request for data. For instance, counter management component 515 may increment a value of a first counter associated with the virtual memory bank based on a memory access operation associated with the data, and may also increment a value of a second counter associated with the memory array based on the virtual memory bank receiving the data.

As described above, counter management component 515 may increment counters associated with a virtual memory bank and/or a memory array based on a received request for data. Accordingly, counter management component may increment one or more saturation counter(s) 530. The saturation counter(s) 530 may include a first counter that may be incremented in response to a virtual memory bank (e.g., virtual memory bank 405 as described with reference to FIGS. 4A and 4B) receiving an access request for data from a host controller. Additionally or alternatively, the saturation counter(s) 530 may include a second counter that may be incremented in response to a non-volatile memory communicating data to a virtual memory bank in response to an access request for data (e.g., from a host controller).

Data management component 520 may communicating data between the virtual memory bank and a buffer of the device based on the first counter satisfying the threshold. In other examples, data management component 520 may communicating the data between the virtual memory bank and the buffer of the device based on the second counter satisfying the threshold.

Access management component 525 may determine values of one or more counters incremented by counter management component 515. For example, access management component 525 may determine that the value of the first counter associated with the virtual memory bank satisfies a threshold.

In some examples, memory interface component 510 may also receive data corresponding to a page size of a memory array of the device. Memory interface component 510 may receive a write command from a host device, wherein the value of the first counter associated with the virtual memory bank is incremented based on receiving the write command. Additionally or alternatively, memory interface component 510 may receive a read command from a host device, wherein the value of the first counter associated with the virtual memory bank is incremented based on receiving the read command. Memory interface component 510 may also receive an indication from a system on a chip (SoC) or processor that the characteristic of the data comprises a data type indicated to be buffered by the (SoC) or processor, wherein the data is communicated to the buffer based on the characteristic.

Counter management component 515 may also increment a value of a first counter associated with the virtual memory bank based on a memory access operation associated with the data. In some examples, counter management component 515 may increment the first counter associated with the virtual memory based on receiving the write command. In other examples, counter management component 515 may increment a value of the first counter associated with the virtual memory bank based on receiving the read command. Additionally or alternatively, counter management component 515 may incrementing a value of a second counter associated with the memory array based on the virtual memory bank receiving the data. The counter management component 515 may also increment a value of a second counter associated with the memory array based on the virtual memory bank receiving the data.

In some examples, data management component 520 may also communicate the data between the virtual memory bank and the memory array based on determining that the value of the first counter does not satisfy the threshold. In other examples, data management component 520 may communicate the data between the virtual memory bank and the memory array based on determining that the value of the second counter does not satisfy the threshold. Additionally or alternatively, data management component 520 may communicate the data between the virtual memory bank and the buffer of the device or the memory array of the device based on the characteristic of the data and/or may communicate the data from the virtual memory bank to a main memory of the device. Data management component 520 may also communicate the data to the buffer based on closing the page.

Access management component 525 may also determine that the value of the first counter associated with the virtual memory bank does not satisfy the threshold before determining that the value of the first counter associated with the virtual memory bank satisfies the threshold. In other examples access management component 525 may determine that a value of the second counter associated with the memory array satisfies the threshold. Access management component 525 may also determine that the value of the second counter associated with the memory array does not satisfy the threshold before determining that the value of the second counter associated with the memory array satisfies the threshold. Additionally or alternatively, access management component 525 may determine whether to communicate the data to a buffer of the device or the memory array of the device based on a characteristic of the data.

Access management component 525 may also determine a quantity of memory access operations associated with the data, wherein the characteristic of the data is based on the quantity of memory access operations and the data is communicated to the buffer based on the quantity of prior memory access operations exceeding a threshold. In some examples, access management component 525 may determine that the data is buffered at a system on a chip (SoC) or processor, wherein the characteristic of the data is based on the data being buffered at the SoC or processor and the data is communicated to the memory array of the device based on determining that the data is buffered at the SoC or processor. Additionally or alternatively, access management component 525 may determine at least one application associated with the data, wherein the characteristic of the data is based on the application associated with the data and the data is communicated to the buffer based on the characteristic.

Figure 6:
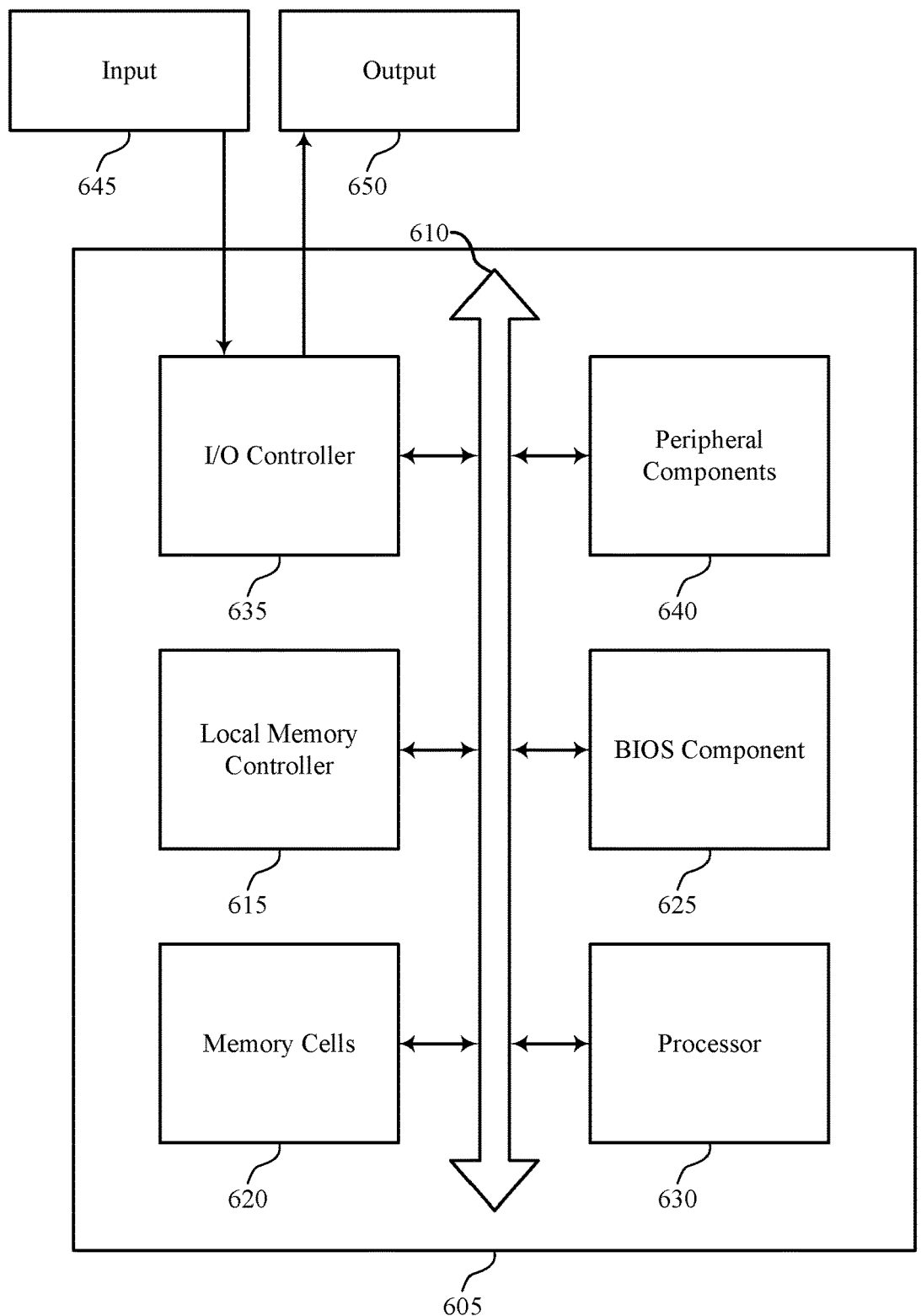
FIG. 6 illustrates a block diagram of a device that supports memory buffer management and bypass in accordance with examples of the present disclosure.

FIG. 6 shows a diagram of a system 600 including a device 605 that supports memory buffer management and bypass in accordance with examples of the present disclosure. Device 605 may be an example of or include the components of a memory sub-system as described above, e.g., with reference to FIG. 2. Device 605 may include components for bi-directional voice and data communications including components for transmitting and receiving communications, including local memory controller 615, memory cells 620, basic input/output system (BIOS) component 625, processor 630, I/O controller 635, and peripheral components 640. These components may be in electronic communication via one or more buses (e.g., bus 610).

Memory cells 620 may store information (i.e., in the form of a logical state) as described herein.

BIOS component 625 be a software component that includes BIOS operated as firmware, which may initialize and run various hardware components. BIOS component 625 may also manage data flow between a processor and various other components, e.g., peripheral components, input/output control component, etc. BIOS component 625 may include a program or software stored in read only memory (ROM), flash memory, or any other non-volatile memory.

Processor 630 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 630 may be configured to operate a memory array using a memory controller. In other cases, a memory controller may be integrated into processor 630. Processor 630 may be configured to execute computer-readable instructions stored in a memory to perform various functions (e.g., functions or tasks supporting memory buffer management and bypass).

I/O controller 635 may manage input and output signals for device 605. I/O controller 635 may also manage peripherals not integrated into device 605. In some cases, I/O controller 635 may represent a physical connection or port to an external peripheral. In some cases, I/O controller 635 may utilize an operating system such as iOS®, ANDROID®, MS-DOS®, MS-WINDOWS®, OS/2®, UNIX®, LINUX®, or another known operating system. In other cases, I/O controller 635 may represent or interact with a modem, a keyboard, a mouse, a touchscreen, or a similar device. In some cases, I/O controller 635 may be implemented as part of a processor. In some cases, a user may interact with device 605 via I/O controller 635 or via hardware components controlled by I/O controller 635.

Peripheral components 640 may include any input or output device, or an interface for such devices. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots.

Input 645 may represent a device or signal external to device 605 that provides input to device 605 or its components. This may include a user interface or an interface with or between other devices. In some cases, input 645 may be managed by I/O controller 635, and may interact with device 605 via a peripheral component 640.

Output 650 may also represent a device or signal external to device 605 configured to receive output from device 605 or any of its components. Examples of output 650 may include a display, audio speakers, a printing device, another processor or printed circuit board, etc. In some cases, output 650 may be a peripheral element that interfaces with device 605 via peripheral component(s) 640. In some cases, output 650 may be managed by I/O controller 635

The components of device 605 may include circuitry designed to carry out their functions. This may include various circuit elements, for example, conductive lines, transistors, capacitors, inductors, resistors, amplifiers, or other active or inactive elements, configured to carry out the functions described herein. Device 605 may be a computer, a server, a laptop computer, a notebook computer, a tablet computer, a mobile phone, a wearable electronic device, a personal electronic device, or the like. Or device 605 may be a portion or aspect of such a device.

Figure 7:
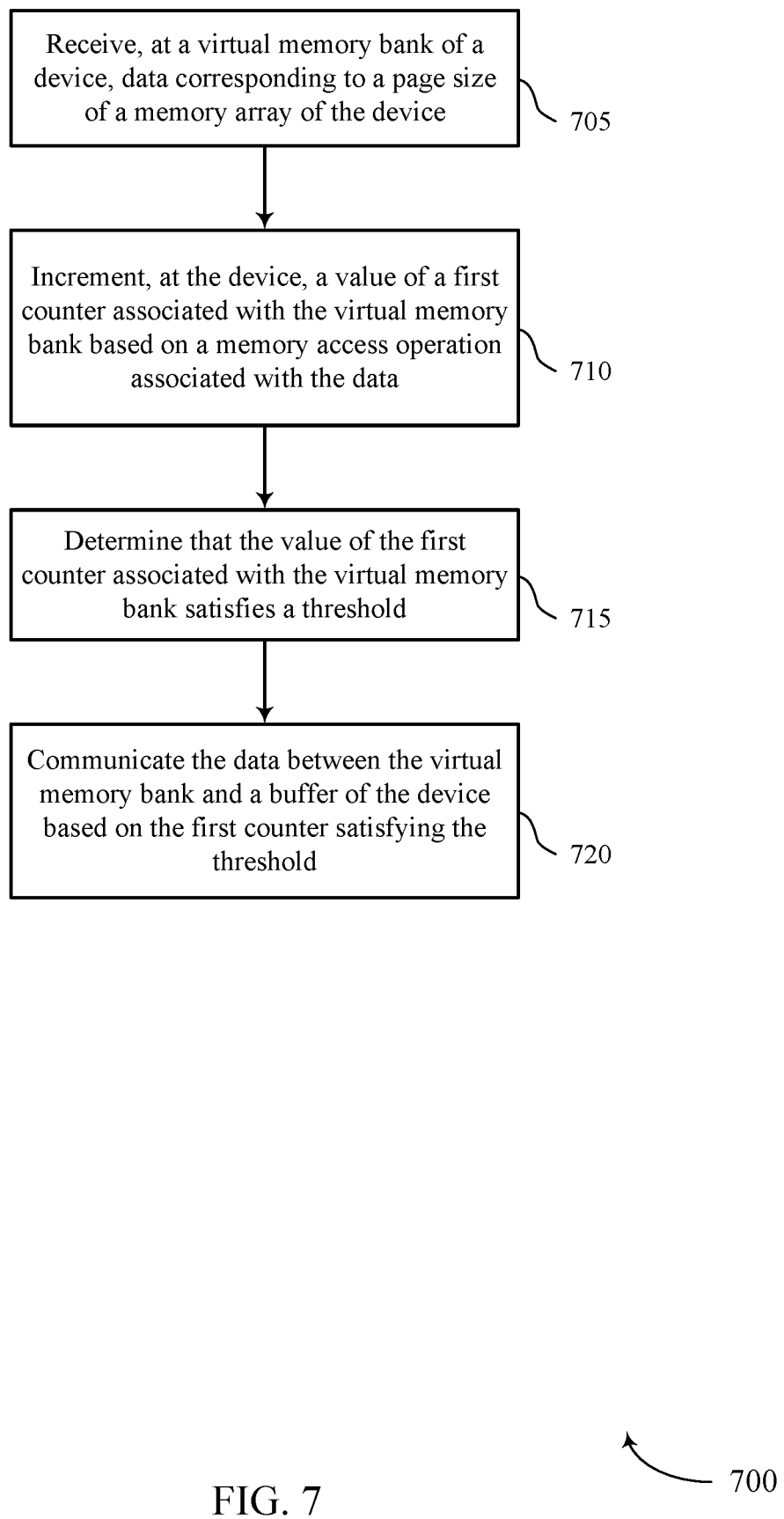
FIGS. 7 through 10 illustrate a method or methods for memory buffer management and bypass in accordance with examples of the present disclosure.

FIG. 7 shows a flowchart illustrating a method 700 for memory buffer management and bypass in accordance with examples of the present disclosure. The operations of method 700 may be implemented by a memory sub-system or its components as described herein.

At 705 the memory sub-system may receive, at a virtual memory bank of a device, data corresponding to a page size of a memory array of the device. The operations of 705 may be performed according to the methods described with reference to FIGS. 3, 4A, and 4B. In certain examples, aspects of the operations of 705 may be performed by one or more components of memory controller 505 as described with reference to FIG. 5.

At 710 the memory sub-system may increment, at the device, a value of a first counter associated with the virtual memory bank based on a memory access operation associated with the data. The operations of 710 may be performed according to the methods described with reference to FIGS. 3, 4A, and 4B. In certain examples, aspects of the operations of 710 may be performed by one or more components of memory controller 505 as described with reference to FIG. 5.

At 715 the memory sub-system may determine that the value of the first counter associated with the virtual memory bank satisfies a threshold. The operations of 715 may be performed according to the methods described with reference to FIGS. 3, 4A, and 4B. In certain examples, aspects of the operations of 715 may be performed by one or more components of memory controller 505 as described with reference to FIG. 5.

At 720 the memory sub-system may communicate the data between the virtual memory bank and a buffer of the device based on the first counter satisfying the threshold. The operations of 720 may be performed according to the methods described with reference to FIGS. 3, 4A, and 4B. In certain examples, aspects of the operations of 720 may be performed by one or more components of memory controller 505 as described with reference to FIG. 5.

Figure 8:
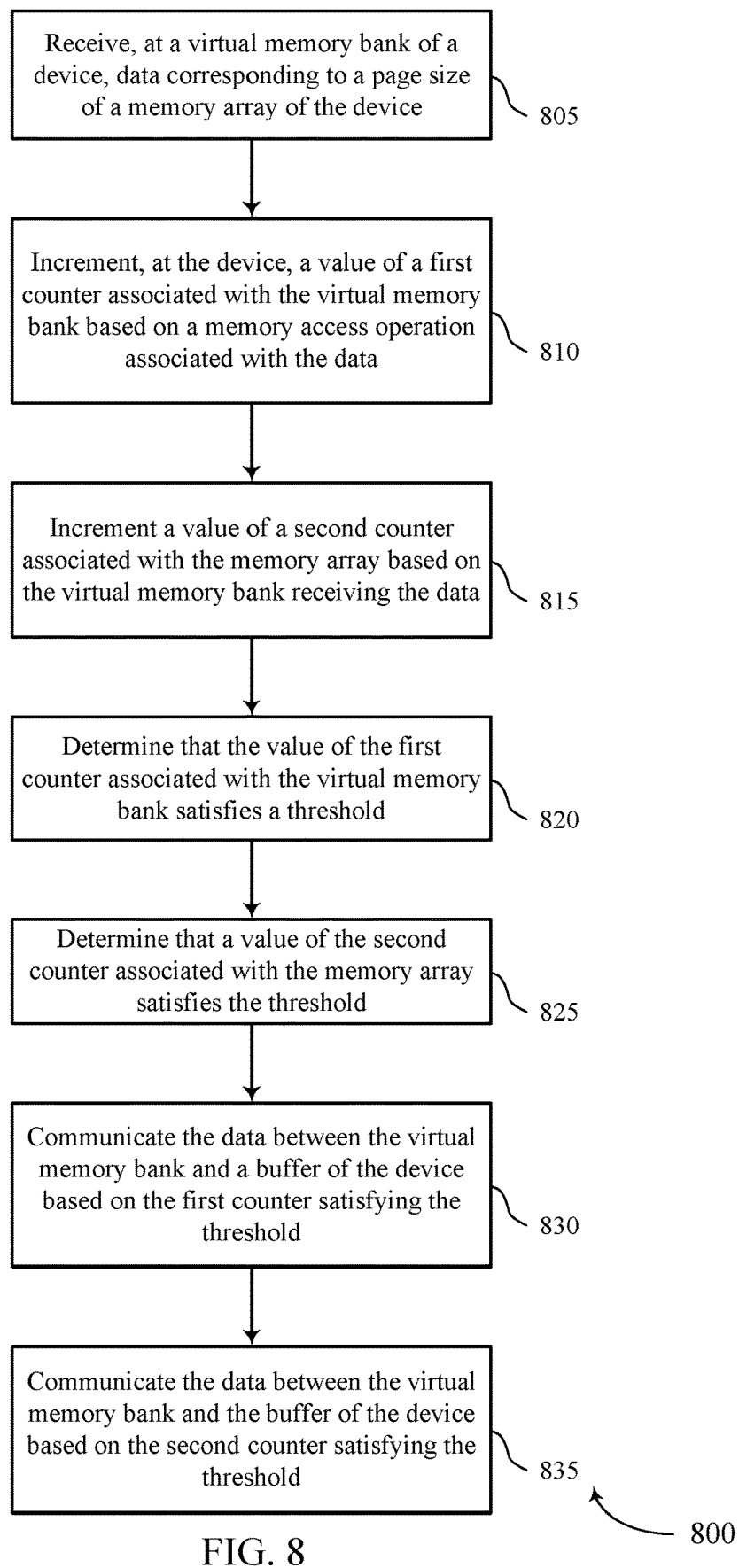

FIG. 8 shows a flowchart illustrating a method 800 for memory buffer management and bypass in accordance with examples of the present disclosure. The operations of method 800 may be implemented by a memory sub-system as described with reference to FIG. 2.

At 805 the memory sub-system may receive, at a virtual memory bank of a device, data corresponding to a page size of a memory array of the device. The operations of 805 may be performed according to the methods described with reference to FIGS. 3, 4A, and 4B. In certain examples, aspects of the operations of 805 may be performed by one or more components of memory controller 505 as described with reference to FIG. 5.

At 810 the memory sub-system may increment, at the device, a value of a first counter associated with the virtual memory bank based on a memory access operation associated with the data. The operations of 810 may be performed according to the methods described with reference to FIGS. 3, 4A, and 4B. In certain examples, aspects of the operations of 810 may be performed by one or more components of memory controller 505 as described with reference to FIG. 5.

At 815 the memory sub-system may increment a value of a second counter associated with the memory array based on the virtual memory bank receiving the data. The operations of 815 may be performed according to the methods described with reference to FIGS. 3, 4A, and 4B. In certain examples, aspects of the operations of 815 may be performed by one or more components of memory controller 505 as described with reference to FIG. 5.

At 820 the memory sub-system may determine that the value of the first counter associated with the virtual memory bank satisfies a threshold. The operations of 820 may be performed according to the methods described with reference to FIGS. 3, 4A, and 4B. In certain examples, aspects of the operations of 820 may be performed by one or more components of memory controller 505 as described with reference to FIG. 5.

At 825 the memory sub-system may determine that a value of the second counter associated with the memory array satisfies the threshold. The operations of 825 may be performed according to the methods described with reference to FIGS. 3, 4A, and 4B. In certain examples, aspects of the operations of 825 may be performed by one or more components of memory controller 505 as described with reference to FIG. 5.

At 830 the memory sub-system may communicate the data between the virtual memory bank and a buffer of the device based on the first counter satisfying the threshold. The operations of 830 may be performed according to the methods described with reference to FIGS. 3, 4A, and 4B. In certain examples, aspects of the operations of 830 may be performed by one or more components of memory controller 505 as described with reference to FIG. 5.

At 835 the memory sub-system may communicate the data between the virtual memory bank and the buffer of the device based on the second counter satisfying the threshold. The operations of 835 may be performed according to the methods described with reference to FIGS. 3, 4A, and 4B. In certain examples, aspects of the operations of 835 may be performed by one or more components of memory controller 505 as described with reference to FIG. 5.

In some cases, the method may also include receiving, at a virtual memory bank of a device, data corresponding to a page size of a memory array of the device. In some cases, the method may include communicating the data between the virtual memory bank and the memory array based on determining that the value of the second counter does not satisfy the threshold. In other cases, the method may include determining that the value of the first counter associated with the virtual memory bank satisfies a threshold.

In some examples, the method may include communicating the data between the virtual memory bank and a buffer of the device based on the first counter satisfying the threshold. In other cases, the method may include setting the value of the first counter to an initial value based on communicating the data between the virtual memory bank and the buffer. Additionally or alternatively, the method may include receiving a write command from a host device, wherein the value of the first counter associated with the virtual memory bank is incremented based on receiving the write command. In some cases, the method may include determining that the value of the first counter associated with the virtual memory bank does not satisfy the threshold before determining that the value of the first counter associated with the virtual memory bank satisfies the threshold.

In some examples, the method may include communicating the data between the virtual memory bank and the memory array based on determining that the value of the first counter does not satisfy the threshold. In other examples, the method may include incrementing, at the device, a value of a first counter associated with the virtual memory bank based on a memory access operation associated with the data. Additionally or alternatively, the data may be received at the virtual memory bank based on the read command, and the data may be communicated from the virtual memory bank to the buffer based on the read command. In some cases, the virtual memory bank and the buffer may be disposed on a same chip.

In other cases, the method may include incrementing a value of a second counter associated with the memory array based on the virtual memory bank receiving the data. In some cases, the method may include determining that a value of the second counter associated with the memory array satisfies the threshold. Additionally or alternatively, the method may include communicating the data between the virtual memory bank and the buffer of the device based on the second counter satisfying the threshold. In some cases, the method may include determining that the value of the second counter associated with the memory array does not satisfy the threshold before determining that the value of the second counter associated with the memory array satisfies the threshold. The method may also include receiving a read command from a host device, wherein the value of the first counter associated with the virtual memory bank may be incremented based on receiving the read command.

Figure 9:
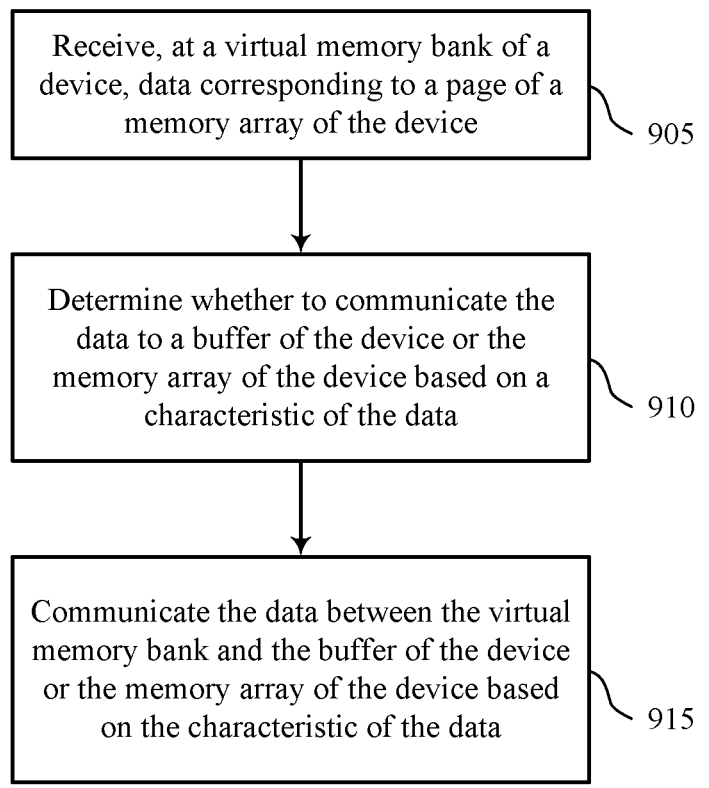

FIG. 9 shows a flowchart illustrating a method 900 for memory buffer management and bypass in accordance with examples of the present disclosure. The operations of method 900 may be implemented by a memory sub-system or its components as described with reference to FIG. 2.

At 905 the memory sub-system may receive, at a virtual memory bank of a device, data corresponding to a page of a memory array of the device. The operations of 905 may be performed according to the methods described with reference to FIGS. 3, 4A, and 4B. In certain examples, aspects of the operations of 905 may be performed by one or more components of memory controller 505 as described with reference to FIG. 5.

At 910 the memory sub-system may determine whether to communicate the data to a buffer of the device or the memory array of the device based on a characteristic of the data. The operations of 910 may be performed according to the methods described with reference to FIGS. 3, 4A, and 4B. In certain examples, aspects of the operations of 910 may be performed by one or more components of memory controller 505 as described with reference to FIG. 5.

At 915 the memory sub-system may communicate the data between the virtual memory bank and the buffer of the device or the memory array of the device based on the characteristic of the data. The operations of 915 may be performed according to the methods described with reference to FIGS. 3, 4A, and 4B. In certain examples, aspects of the operations of 915 may be performed by one or more components of memory controller 505 as described with reference to FIG. 5.

Figure 10:
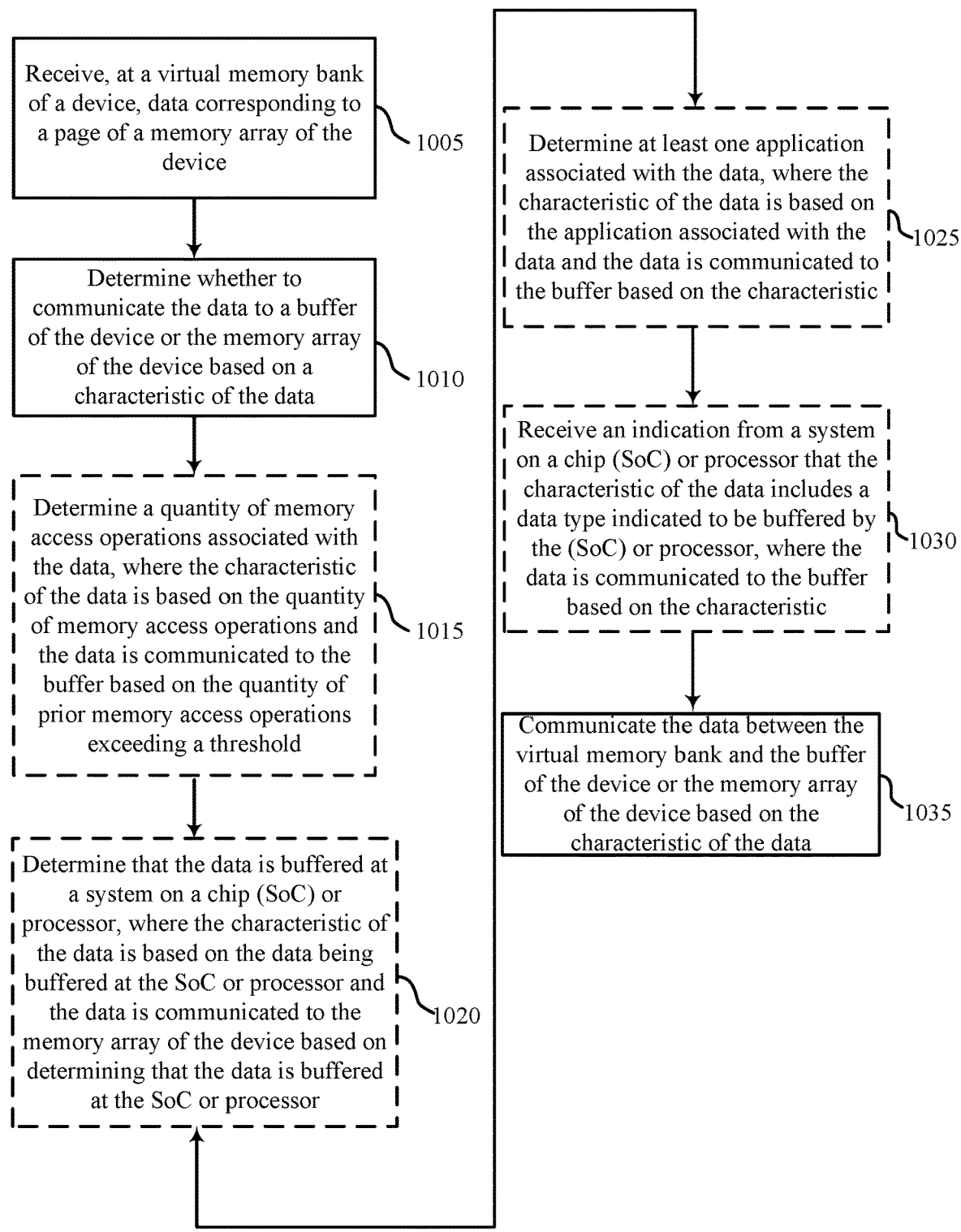

FIG. 10 shows a flowchart illustrating a method 1000 for memory buffer management and bypass in accordance with examples of the present disclosure. The operations of method 1000 may be implemented by a memory sub-system as described with reference to FIG. 2.

At 1005 the memory sub-system may receive, at a virtual memory bank of a device, data corresponding to a page of a memory array of the device. The operations of 1005 may be performed according to the methods described with reference to FIGS. 3, 4A, and 4B. In certain examples, aspects of the operations of 1005 may be performed by one or more components of memory controller 505 as described with reference to FIG. 5.

At 1010 the memory sub-system may determine whether to communicate the data to a buffer of the device or the memory array of the device based on a characteristic of the data. The operations of 1010 may be performed according to the methods described with reference to FIGS. 3, 4A, and 4B. In certain examples, aspects of the operations of 1010 may be performed by one or more components of memory controller 505 as described with reference to FIG. 5.

At 1015 the memory sub-system may determine a quantity of memory access operations associated with the data, wherein the characteristic of the data is based on the quantity of memory access operations and the data is communicated to the buffer based on the quantity of prior memory access operations exceeding a threshold. The operations of 1015 may be performed according to the methods described with reference to FIGS. 3, 4A, and 4B. In certain examples, aspects of the operations of 1015 may be performed by one or more components of memory controller 505 as described with reference to FIG. 5.

At 1020 the memory sub-system may determine that the data is buffered at a system on a chip (SoC) or processor, wherein the characteristic of the data is based on the data being buffered at the SoC or processor and the data is communicated to the memory array of the device based on determining that the data is buffered at the SoC or processor. The operations of 1020 may be performed according to the methods described with reference to FIGS. 3, 4A, and 4B. In certain examples, aspects of the operations of 1020 may be performed by one or more components of memory controller 505 as described with reference to FIG. 5.

At 1025 the memory sub-system may determine at least one application associated with the data, wherein the characteristic of the data is based on the application associated with the data and the data is communicated to the buffer based on the characteristic. The operations of 1025 may be performed according to the methods described with reference to FIGS. 3, 4A, and 4B. In certain examples, aspects of the operations of 1025 may be performed by one or more components of memory controller 505 as described with reference to FIG. 5.

At 1030 the memory sub-system may receive an indication from a system on a chip (SoC) or processor that the characteristic of the data comprises a data type indicated to be buffered by the (SoC) or processor, wherein the data is communicated to the buffer based on the characteristic. The operations of 1030 may be performed according to the methods described with reference to FIGS. 3, 4A, and 4B. In certain examples, aspects of the operations of 1030 may be performed by one or more components of memory controller 505 as described with reference to FIG. 5.

At 1040 the memory sub-system may communicate the data between the virtual memory bank and the buffer of the device or the memory array of the device based on the characteristic of the data. The operations of 1040 may be performed according to the methods described with reference to FIGS. 3, 4A, and 4B. In certain examples, aspects of the operations of 1040 may be performed by one or more components of memory controller 505 as described with reference to FIG. 5.

In some cases, the method may include receiving, at a virtual memory bank of a device, data corresponding to a page of a memory array of the device. In other cases, the method may include communicating the data to the buffer based on closing the page. In some examples, the method may include communicating the data between the virtual memory bank and the buffer of the device or the memory array of the device based on the characteristic of the data. Additionally or alternatively, the method may include determining a quantity of memory access operations associated with the data, wherein the characteristic of the data is based on the quantity of memory access operations and the data is communicated to the buffer based on the quantity of prior memory access operations exceeding a threshold.

In some cases, the method may include determining that the data is buffered at a system on a chip (SoC) or processor, wherein the characteristic of the data is based on the data being buffered at the SoC or processor and the data is communicated to the memory array of the device based on determining that the data is buffered at the SoC or processor. In other cases, the method may include determining at least one application associated with the data, wherein the characteristic of the data is based on the application associated with the data and the data is communicated to the buffer based on the characteristic. Additionally or alternatively, the method may include determining whether to communicate the data to a buffer of the device or the memory array of the device based on a characteristic of the data.

In some cases, the method may include receiving an indication from a system on a chip (SoC) or processor that the characteristic of the data comprises a data type indicated to be buffered by the (SoC) or processor, wherein the data is communicated to the buffer based on the characteristic. In some examples, the method may include adjusting a value of a first counter associated with the virtual memory bank based on determining the characteristic of the data. In other cases, the method may include determining that the value of the first counter associated with the virtual memory bank satisfies a threshold. Additionally or alternatively, the method may include closing the page of the memory array opened at the virtual memory bank based on the first counter satisfying the threshold. In some cases, communicating the data between the virtual memory bank and the memory array may include communicating the data from the virtual memory bank to a main memory of the device.

It should be noted that the methods described above describe possible implementations, and that the operations and the steps may be rearranged or otherwise modified and that other implementations are possible. Furthermore, examples from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

As used herein, the term "substantially" means that the modified characteristic (e.g., a verb or adjective modified by the term substantially) need not be absolute but is close enough so as to achieve the advantages of the characteristic.

The devices discussed herein, including system 100, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A transistor or transistors discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at an interface controller coupled with a first memory and a second memory, a request for data stored in one or more of the first memory and the second memory wherein the second memory is operated as a cache for the first memory;
   incrementing a counter associated with the first memory based at least in part on determining to communicate the data from the first memory to a host device; and
   communicating, based at least in part on incrementing the counter associated with the first memory, the data from the first memory to a buffer coupled with the first memory and the second memory, wherein communicating the data comprises:
   communicating the data from the first memory to the second memory; and
   communicating the data from the second memory to the buffer.

2. The method of claim 1, further comprising:
   determining, based at least in part on the counter, that the data in the first memory has been accessed a threshold quantity of times in a threshold duration, wherein the data is communicated to the buffer based at least in part on determining that the first memory has been accessed the threshold quantity of times in the threshold duration.

3. The method of claim 1, further comprising:
   communicating the data from the first memory to the host device, wherein the counter is incremented based at least in part on communicating the data from the first memory to the host device;
   receiving a second request for the data at the interface controller; and
   communicating the data from the buffer to the host device based at least in part the second request.

4. The method of claim 1, wherein the counter is associated with the data, the method further comprising:
   incrementing a second counter associated with second data stored in the first memory based at least in part on determining to communicate the second data from the first memory to the host device in response to a second request.

5. The method of claim 1, further comprising:
   receiving a second request for second data at the interface controller; and
   incrementing a second counter associated with the second data stored in the second memory based at least in part on determining to communicate the second data from the second memory to the host device in response to the second request.

6. The method of claim 5, further comprising:
   determining, based at least in part on incrementing the second counter, that a value of the second counter is greater than or equal to a threshold value; and
   communicating the second data to the buffer based at least in part on determining that the value of the second counter exceeds the threshold value.

7. The method of claim 5, further comprising:
   communicating at least a subset of the second data from the second memory to the first memory based at least in part on incrementing the second counter and determining that the second data in the second memory has been accessed fewer than a threshold quantity of times in a threshold duration.

8. The method of claim 5, further comprising:
   maintaining a value of the counter associated with the first memory based at least in part on determining to communicate the second data from the second memory to the host device.

9. An apparatus, comprising:
   a controller coupled with a first memory and a second memory, the controller to interface with a host device and operable to cause the apparatus to:
   receive a request for data stored in one or more of the first memory and the second memory, wherein the second memory is configured as a cache for the first memory;
   increment a counter associated with the first memory based at least in part on determining to communicate the data from the first memory to the host device; and
   communicate, based at least in part on incrementing the counter associated with the first memory, the data from the first memory to a buffer coupled with the first memory and the second memory, wherein communicating the data comprises:
   communicating the data from the first memory to the second memory; and
   communicating the data from the second memory to the buffer.

10. The apparatus of claim 9, wherein the controller is operable to cause the apparatus to:
    determine, based at least in part on the counter, that the data in the first memory has been accessed a threshold quantity of times in a threshold duration, wherein the data is communicated to the buffer based at least in part on determining that the first memory has been accessed the threshold quantity of times in the threshold duration.

11. The apparatus of claim 9, wherein the controller is operable to cause the apparatus to:
  communicate the data from the first memory to the host device;
  receive a second request for the data at the controller; and
  communicate the data from the buffer to the host device based at least in part the second request.

12. The apparatus of claim 9, wherein the controller is operable to cause the apparatus to:
  increment a second counter associated with second data stored in the second memory based at least in part on determining to communicate the second data from the first memory to the host device in response to a second request.

13. A method, comprising:
  storing a set of data in a first memory coupled with a controller configured to interface with a host device;
  determining a characteristic associated with the set of data based at least in part on storing the set of data in the first memory, wherein determining the characteristic comprises determining a quantity of access operations performed on the set of data in the first memory;
  determining that the quantity of access operations does not satisfy a threshold quantity; and
  communicating, based at least in part on the characteristic associated with the set of data and based at least in part on determining that the quantity of access operations does not satisfy the threshold quantity, at least a subset of the set of data from the first memory to a second memory coupled with the controller.

14. A method, comprising:
  storing a set of data in a first memory coupled with a controller configured to interface with a host device;
  determining a characteristic associated with the set of data based at least in part on storing the set of data in the first memory, wherein determining the characteristic comprises:
  determining that the set of data is of a type of data buffered at the host device coupled with the controller; and
  communicating, based at least in part on the characteristic associated with the set of data, the set of data from the first memory to a second memory coupled with the controller, wherein the set of data is communicated to the second memory based at least in part on determining that the set of data is of the type of data buffered at the host device.

15. A method, comprising:
  storing a set of data in a first memory coupled with a controller configured to interface with a host device;
  determining a characteristic associated with the set of data based at least in part on storing the set of data in the first memory, wherein determining the characteristic comprises:
  determining that the set of data is associated with a type of application that is associated with a latency longer than a threshold latency; and
  communicating, based at least in part on the characteristic associated with the set of data, the set of data from the first memory to a second memory coupled with the controller, wherein the set of data is communicated to the second memory based at least in part on the type of application.

16. A method, comprising:
  storing a set of data in a first memory coupled with a controller configured to interface with a host device;
  determining a characteristic associated with the set of data based at least in part on storing the set of data in the first memory, wherein determining the characteristic comprises:
  determining that the set of data is associated with a type of application that is associated with a latency shorter than a threshold latency; and
  communicating, based at least in part on the characteristic associated with the set of data, the set of data from the first memory to a buffer coupled with the first memory, wherein the set of data is communicated to the buffer based at least in part on the type of application.

* * * * *